United States Patent
Kahle et al.

(10) Patent No.: US 10,300,573 B2
(45) Date of Patent: May 28, 2019

(54) MEASUREMENT, LAYOUT, MARKING, FIRESTOP STICK

(71) Applicant: Trimble Inc., Sunnyvale, CA (US)

(72) Inventors: Kent Kahle, Hayward, CA (US); Young Jin Lee, Westminster, CO (US)

(73) Assignee: Trimble Inc., Sunnyvale, CA (US)

( * ) Notice: Subject to any disclaimer, the term of this patent is extended or adjusted under 35 U.S.C. 154(b) by 16 days.

(21) Appl. No.: 15/604,172

(22) Filed: May 24, 2017

(65) Prior Publication Data
US 2018/0339387 A1    Nov. 29, 2018

(51) Int. Cl.
| | |
|---|---|
| *H04N 7/18* | (2006.01) |
| *G01C 1/00* | (2006.01) |
| *G01C 3/02* | (2006.01) |
| *B23Q 17/24* | (2006.01) |
| *B23Q 17/20* | (2006.01) |
| *G01C 15/06* | (2006.01) |
| *G01C 15/00* | (2006.01) |

(52) U.S. Cl.
CPC ......... *B23Q 17/2409* (2013.01); *B23Q 17/20* (2013.01); *G01C 15/00* (2013.01); *G01C 15/002* (2013.01); *G01C 15/06* (2013.01); *H04N 7/181* (2013.01)

(58) Field of Classification Search
CPC ..................... G01C 15/00; G06T 2207/30204
See application file for complete search history.

(56) References Cited

U.S. PATENT DOCUMENTS

| | | | |
|---|---|---|---|
| 2,685,082 A | 7/1954 | Beman et al. | |
| 2,966,090 A | 12/1960 | Schöldström | |
| 5,602,584 A | 2/1997 | Mitsutake et al. | |
| 5,926,260 A | 7/1999 | Dunne et al. | |
| 6,064,398 A | 5/2000 | Ellenby et al. | |
| 6,097,429 A | 8/2000 | Seeley et al. | |
| 6,108,920 A * | 8/2000 | Kinoshita | G01C 15/06 33/293 |

(Continued)

FOREIGN PATENT DOCUMENTS

| | | |
|---|---|---|
| EP | 2 116 919 A1 | 11/2009 |
| EP | 2 602 641 A1 | 6/2013 |

(Continued)

OTHER PUBLICATIONS

"Grade Control for Dozers," Civil Engineering and Construction, downloaded from http://construction.trimble.com/products-and-solutions/grade-control-dozers, 2 pages.

(Continued)

*Primary Examiner* — Rebecca A Volentine
(74) *Attorney, Agent, or Firm* — Kilpatrick Townsend & Stockton LLP

(57) ABSTRACT

Multiple cameras are used for tool positioning, as-built documentation, and/or personnel monitoring in construction site. A camera unit comprises one or more imaging devices, a processing computer, and a communication device. The camera units are placed at multiple locations in a construction site to cover an area. The camera units are self-positioned by detecting a calibration target that moves within a working volume. The camera units can detect and calculate positions of objects, including measurement sticks, tools, personnel, etc., in the area.

10 Claims, 15 Drawing Sheets

(56) References Cited

U.S. PATENT DOCUMENTS

| | | |
|---|---|---|
| 6,697,147 B2 | 2/2004 | Ko et al. |
| 6,919,880 B2 | 7/2005 | Morrison et al. |
| 7,061,689 B2 | 6/2006 | Ichinose et al. |
| 7,215,364 B2 | 5/2007 | Wachtel et al. |
| 7,949,150 B2 | 5/2011 | Haering et al. |
| 8,350,908 B2 | 1/2013 | Morris et al. |
| 8,587,661 B2 | 11/2013 | McCubbrey |
| 8,874,406 B2 | 10/2014 | Røtvold et al. |
| 9,639,935 B1 | 5/2017 | Douady-Pleven et al. |
| 9,706,264 B2 | 6/2017 | Belsarkar |
| 2004/0071367 A1 | 4/2004 | Irani et al. |
| 2004/0247174 A1 | 12/2004 | Lyons et al. |
| 2006/0119713 A1 | 6/2006 | Deguchi et al. |
| 2006/0174302 A1 | 8/2006 | Mattern et al. |
| 2006/0271298 A1 | 11/2006 | MacIntosh et al. |
| 2008/0211915 A1 | 9/2008 | McCubbrey |
| 2008/0240616 A1 | 10/2008 | Haering et al. |
| 2009/0237490 A1 | 9/2009 | Nelson, Jr. |
| 2009/0324009 A1* | 12/2009 | Schulz ............ G06T 7/73 382/103 |
| 2010/0092079 A1* | 4/2010 | Aller ............ G06K 9/3216 382/165 |
| 2010/0183422 A1 | 7/2010 | Mäkelä et al. |
| 2011/0115909 A1 | 5/2011 | Sternberg et al. |
| 2012/0044328 A1 | 2/2012 | Gere |
| 2012/0162360 A1 | 6/2012 | Ohtomo et al. |
| 2012/0182418 A1* | 7/2012 | Kumagai ............ G01C 5/00 348/137 |
| 2012/0186088 A1* | 7/2012 | Amor ............ G01C 15/002 33/228 |
| 2012/0303336 A1 | 11/2012 | Becker et al. |
| 2013/0096873 A1* | 4/2013 | Rosengaus ........ G01C 15/002 702/151 |
| 2013/0152413 A1* | 6/2013 | Nagao ............ G01C 15/06 33/366.23 |
| 2014/0063229 A1 | 3/2014 | Olsson et al. |
| 2014/0218612 A1 | 8/2014 | Belsarkar |
| 2014/0267685 A1 | 9/2014 | Kahle et al. |
| 2014/0304995 A1* | 10/2014 | Kumagai ............ G01C 15/004 33/267 |
| 2014/0313316 A1 | 10/2014 | Olsson et al. |
| 2014/0320607 A1 | 10/2014 | Hamann et al. |
| 2015/0009473 A1 | 1/2015 | Su |
| 2015/0276402 A1* | 10/2015 | Grasser ............ G01C 15/06 702/150 |
| 2015/0355144 A1 | 12/2015 | Bartuli |
| 2015/0363936 A1* | 12/2015 | Hallett ............ G06T 7/0057 382/106 |
| 2015/0373266 A1 | 12/2015 | Hsieh et al. |
| 2016/0012590 A1* | 1/2016 | McFadden ............ G01V 8/00 382/106 |
| 2016/0057361 A1 | 2/2016 | Attar et al. |
| 2016/0314593 A1* | 10/2016 | Metzler ............ G06T 7/337 |
| 2017/0023492 A1 | 1/2017 | Olsson et al. |
| 2017/0251149 A1 | 8/2017 | Huang et al. |
| 2017/0324949 A1 | 11/2017 | Chen et al. |
| 2018/0058850 A1* | 3/2018 | Edelman ............ G01C 15/06 |
| 2018/0136314 A1 | 5/2018 | Taylor et al. |
| 2018/0343421 A1 | 11/2018 | Kahle et al. |

FOREIGN PATENT DOCUMENTS

| | | |
|---|---|---|
| EP | 3 150 961 A1 | 4/2017 |
| FR | 2 630 538 A1 | 10/1989 |
| JP | 2008-116384 A | 5/2008 |
| WO | 2010/148526 A1 | 12/2010 |

OTHER PUBLICATIONS

"Trimble Total Stations," Transforming the Way the World Works, downloaded from http://trl.trimble.com/docushare/dsweb/Get/Document-752084/022516-168B_Trimble_S-Series_TS_BRO_US_0416_LR.pdf, 16 pages.

Kan, Z. "Vision-Based Estimation and Control," downloaded from https://sites.google.com/site/kanzhen0322/reserach/vision, 4 pages.

"eCAMSECURE," Commercial Security Systems, Video Monitoring, downloaded from https://www.ecamsecure.com/, 4 pages.

U.S. Appl. No. 15/604,161 First Action Interview Pilot Program Pre-Interview Communication dated Mar. 14, 2018, 9 pages.

U.S. Appl. No. 15/604,161 Final Office Action dated Sep. 10, 2018, 13 pages.

U.S. Appl. No. 15/604,169 Restriction Requirement dated Sep. 11, 2018, 7 pages.

International Search Report and Written Opinion for Application No. PCT/US2018/033243, dated Oct. 8, 2018, 24 pages.

Non-Final Office Action for U.S. Appl. No. 15/604,169 dated Nov. 27, 2018, 12 pages.

U.S. Appl. No. 15/604,161 Non-Final Office Action dated Dec. 12, 2018, 14 pages.

* cited by examiner

MEASUREMENT, LAYOUT, MARKING, FIRESTOP STICK

CROSS-REFERENCE TO RELATED APPLICATIONS

The following four U.S. patent applications (including this one) are being filed concurrently, and the entire disclosure of the other applications are incorporated by reference into this application for all purposes:

application Ser. No. 15/604,169, filed May 24, 2017, entitled "Infrastructure Positioning Camera System";

application Ser. No. 15/604,161, filed May 24, 2017, entitled "Calibration Approach for Camera Placement"; and application Ser. No. 15/604,172, filed May 24, 2017, entitled "Measurement, Layout, Marking, Firestop Stick."

BACKGROUND

This disclosure relates to systems and methods that facilitate positioning points and objects in a workspace or at a worksite, such as for example at a construction site. When the interior of a building is being finished, connectors, anchors, and the like are attached to the floors, ceilings and other structures in the building and cuts are made and holes drilled using power saws and drills. All of this must be accomplished using special power tools at predetermined locations, requiring that the tools be operated at numerous precisely defined positions in the building. For example, nail guns, power saws, powder anchor tools, and the like are used to nail, cut, install fasteners, and perform other operations at predetermined points within the building with little error. In any building, a large number of electrical, plumbing, and HVAC components must be properly sited and installed, usually with power tools. Additionally, finishing a building interior also requires that a number of different tools that are not powered be operated at precisely defined positions, such as for example reinforcement bar scanners. Positioning both power tools and non-power tools must be accomplished quickly and with some precision with respect to the surrounding walls, ceilings and floors as they are roughed in. Typically, it has required a significant amount of labor to lay out various construction points at such a construction site. Teams of workers have been needed to measure and mark predetermined locations. It will be appreciated that this process has been subject to errors, resulting from measurement mistakes and from accumulated errors. Further, the cost of this layout process and the time needed to perform the layout process have both been significant.

Various location determining systems, including systems that incorporate one or more robotic total stations, have been used for building layout. The total station in such a system, positioned at a fixed, known location, directs a beam of laser light at a retro-reflective target. As the target moves, robotics in the total station cause the beam of light to track the target. By measuring the time of travel of the beam from the total station to the retro-reflective target and then back to the total station, the distance to the target is determined. The directional orientation of the beam to the target is also measured. Since the dimensional coordinates of the total station are known, the dimensional coordinates of the retro-reflective target can easily be determined. Based on the measured position of the retro-reflective target, and the desired position of some building feature, such as a drilled hole, or a fastener, the operator can move the reflector to the desired position, and mark the position.

Although position determination systems, such as ranging radio systems and robotic total station systems, can facilitate and speed the layout process, nevertheless the layout process has continued to be lengthy, tedious, and expensive. Previous applications have been filed addressing systems and/or methods to reduce construction expense and/or labor. For example, U.S. patent application Ser. No. 13/800,350, filed Mar. 13, 2013, which is incorporated by reference, provides systems and methods for positioning a tool in a workspace.

BRIEF SUMMARY

In some embodiments, a system for tool positioning, as-built documentation, personnel monitoring in construction site using camera network is described. The system comprises multiple camera units, a main processing computer, measurement stick(s), calibration target(s), and user visualization devices. A camera unit comprises one or more imaging devices, a processing computer, and/or a communication device.

Camera units are placed at multiple unknown locations in a construction site that cover a working volume. The camera units are self-positioned in an arbitrary coordinate system by detecting a calibration target that moves within the working volume by one or more human operators. Then the arbitrary coordinate system can be transformed to a desired coordinate system.

Camera units, in combination with a main processing computer, can detect and calculate positions of objects in the working volume, including measurement sticks, tools, personnel, etc. Camera units in combination with the main processing computer can monitor work progress for as-built documentation and reporting. The measurement stick can measure a point and/or a distance within the working volume.

In some embodiments, a camera unit can detect its own motion by continuously monitoring a static scene. For example, if the camera unit remains stationary, the scene from the camera unit is also stationary, except moving objects such as workers and etc. If the camera unit moves, then all objects in the scene will move. In some embodiments, a camera unit detecting its own motion reduces or prevents object position errors caused by unintentional movement of the camera unit.

In some embodiments, a camera system comprises a housing; a first imaging system integrated with the housing, the first imaging system comprising: a first lens, and a first image sensor for detecting light from the first lens to generate first data, wherein: the first data is image data, and the first imaging system has a first field of view; a second imaging system integrated with the housing, the second imaging system comprising: a second lens, and a second image sensor for detecting light from the second lens to generate second data, wherein: the second data is image data, the second imaging system has a second field of view, the first field of view and the second field of view combine to form a third field of view, the third field of view is larger than the first field of view, and the third field of view is larger than the second field of view; a processor, integrated with the housing, configured to generate third data from the first data and/or the second data, wherein the third data corresponds to position information of an object; and a communication interface configured to transmit the third data. In some embodiments, the housing is a first housing of a first camera unit; the processor is a first processor; and the camera system further comprises: a second housing of a second camera unit, the second housing comprising: a third imaging system, a fourth imaging system, and a second processor to generate fourth data from image data from the third imaging system and/or the fourth imaging system; and a main processing computer configured to: receive the third data and the fourth data, and determine a position of the object in three dimensions based the third data and the fourth data. The second processor, the third imaging system, and/or the fourth imaging system are configured to receive power from a power source integrated with the first housing. The first field of view is between 20 degrees and 40 degrees, the second field of view is between 20 degrees and 40 degrees, and a fourth field of view of imaging systems integrated with the housing is 90 degrees, plus or minus 30 degrees. In some embodiments, imaging systems integrated with the housing have a combined field of view of 180 degrees, plus or minus 30 degrees. In some embodiments the system further comprises a third housing, and two or more imaging systems integrated with the third housing, such that imaging systems of the first housing, imaging systems integrated with the second housing, and imaging systems integrated with the third housing are configured to have a combined field of view of 270 degrees, plus or minus 30 degrees; and/or a third imaging system integrated with the housing, the third imaging system comprising: a third lens; and a third image sensor for detecting light from the third lens, wherein: the third imaging system has a fourth field of view, the fourth field of view partially overlaps with the third field of view to form a fifth field of view, and the fifth field of view is 90 degrees plus or minus 30 degrees. In some embodiments, the fifth field of view is 90 degrees, plus or minus 10 degrees; the third data is based on the first data and the second data; and/or the housing is a first housing of a first camera unit, the camera system further comprises a second camera unit removably connected with the first camera unit, the first camera unit has a field of view of 90 degrees, +/−30 degrees, and the second camera unit has a field of view of 90 degrees, +/−30 degrees, such that the first camera unit and the second camera unit have a combined field of view of 180 degrees, +/−30 degrees. In some embodiments, the system further comprises a magnet coupled with the housing to attach the housing to metal; and or a power interface integrated with the housing to connect to a power source using a power cord, and a battery integrated with the housing.

In some embodiments, a method for using a camera system comprises acquiring a first image of an object using a first image sensor, wherein the first image is defined by first data; acquiring a second image of the object using a second image sensor, wherein: the second image is defined by second data, and the first image sensor and the second image sensor are both within a housing of a camera unit; calculating third data by processing the first data and/or the second data, wherein: the third data corresponds to position information of the object in relation to the first image sensor, the third data corresponds to position information of the object in relation to the second image sensor, and calculating the third data is performed by a processor within the housing of the camera unit; and transmitting the third data from the processor within the housing of the camera unit to a main processing computer, wherein the main processing computer is outside the housing of the camera unit. The housing of the camera unit is a first housing of a first camera unit, the processor is a first processor, and the method further comprises placing the first housing of the first camera unit at a first location; placing a second housing of a second camera unit at a second location, wherein: the second camera unit comprises a third image sensor and a second processor, the first location is separated from the second location by at least 10 feet and less than 200 feet; acquiring a third image using the third image sensor; calculating fourth data based on the third image; transmitting the fourth data from the second processor to the main processing computer; and calculating a three-dimensional position of the object based on the third data and fourth data. In some embodiments the method comprises tracking personnel, in three dimensions based at least partially on the first data and the second data; recording images from the camera unit to create a time-lapse sequence to show construction progress for as-built documentation; and/or removably connecting a third camera unit and a fourth camera unit with the first camera unit and the second camera unit, such that first camera unit, the second camera unit, the third camera unit, and the fourth camera unit have a combined field of view of 360 degrees. The camera unit is a first camera unit and the method further comprises removably connecting the first camera unit with a second camera unit, such that first camera unit and the second camera unit have a combined field of view of 180 degrees, +/−30 degrees. In some embodiments, a memory device comprises instruction that when executed cause one or more processors to perform one or more steps.

In some embodiments, a method for calibrating a camera system comprises placing a first camera unit in an area; placing a second camera unit in the area; acquiring, using the first camera unit, a first sequence of images of a target moving in the area; acquiring, using the second camera unit, a second sequence of images of the target moving in the area, wherein images of the first sequence of images are related by time to images of the second sequence of images; calculating a position and an orientation of the second camera unit relative to the first camera unit based on the first sequence of images of the target and the second sequence of images of the target; identifying two or more points in the in the first sequence of images and in the second sequence of images, wherein the two or more points correspond to points in a model; and calculating a position and an orientation of the first camera unit relative to the model based on identification of the two or more points in the first sequence of images and in the second sequence of images. In some embodiments, the method comprises moving the target in the area; recalculating the position and/or the orientation of the first camera unit based on detecting movement of the first camera unit, wherein: the position and/or the orientation of the first camera unit is recalculated after calculating the position and the orientation of the second camera unit relative to the first camera unit, and the position and/or the orientation of the first camera unit is recalculated based on detecting a background shift using images acquired by the first camera unit; displaying to a user the number of calculated positions of the target as the calculated positions are made; displaying to a user calculated positions of the target from one or more image sensors in one or more camera units; and/or transmitting positions and/or orientations of objects to a display, wherein the display is a monitor; and/or part of a hand-held device, a head-mount device, a helmet-mount device, or glasses. In some embodiments calculating a position and orientation of the first camera unit relative to the model is performed after calculating a position and an orientation of the second camera unit relative to the first camera unit; the target is a first target, the first sequence of images and the second sequence of images include images of a second target, and the method further comprises calculating the position and the orientation of the second camera unit relative to the first camera unit further based on the first sequence of images of the second target and the second sequence of images of the second target; a number of calculated positions of the target used in calculating the position and the orientation of the second camera unit relative to the first camera unit is between 100 and 10,000, and the number of calculated positions correspond to a number of frames used in the first sequence of images and the number of frames used in the second sequence of images used to calculate the position and the orientation of the second camera unit relative to the first camera unit; and/or displaying to the user the number of calculated positions of the target changes in color and/or style based on the number of calculated positions. In some embodiments, a memory device causes one or more processors to perform one or more steps.

In some embodiments, a system for calibrating camera units comprises a first camera unit; a second camera unit; a target; and one or more processors configured to: acquire a first sequence of images of the target using the first camera unit, acquire a second sequence of images of the target using the second camera unit, wherein images of the first sequence of images are related in time to images of the second sequence of images, and calculate a relative position of the second camera unit in relation to the first camera unit based on the first sequence of images of the target and the second sequence of images of the target. In some embodiments, the system further comprises a third camera unit configured to acquire a third sequence of images of the target; a fourth camera unit configured to acquire a fourth sequence of images of the target; and the one or more processors are configured to: calculate a position and an orientation of the third camera unit with respect to the first camera unit based on the first sequence of images of the target and the third sequence of images of the target, and calculate a position and an orientation of the fourth camera unit with respect to the first camera unit based on the first sequence of images of the target and the fourth sequence of images of the target; and/or a display configured to display positions and/or orientations of objects to a user. In some embodiments, the one or more processors are further configured to: identify two or more points in the first sequence of images and in the second sequence of images, wherein the two or more points correspond to points in a model, and calculate a position and an orientation of the first camera unit relative to the model based on the first sequence of images of the target, the second sequence of images of the target, and identification of the two or more points in the first sequence of images and/or in the second sequence of images; the first camera unit comprises three image sensors; the target is a stick with markings; and/or the one or more processors are configured to: identify two or more points in an area on the first sequence of images and/or on the second sequence of images, wherein the two or more points correspond to points in a model of the area, and calculate a position and an orientation of the first camera unit in relation to the model based on identifying the two or more points in the first sequence of images and/or in the second sequence of images.

In some embodiments, a system for providing position and orientation of an object at a worksite comprises a first camera unit; a second camera unit; a third camera unit; a device, wherein the device comprises markings of known dimensions; and one or more processors configured to track a position and an orientation of the device in three dimensions based on the known dimensions of the markings and known positions of the first camera unit, the second camera unit, and the third camera unit. In some embodiments, the system comprises a fourth camera unit; a chip set for coordinating timing of the first camera unit, the second camera unit, and the third camera unit in acquiring images; and/or a first set of templates for determining a scale to use for selecting a template of a second set of templates, and the second set of templates for identifying an end of the device. In some embodiments, the device is a stick, the stick comprising central markings and end markings, and the central markings are used to determine a scale of the stick in images and the end markings are used to determine an end of the stick in images; and/or the one or more processors are configured to track a position and an orientation of the device in three dimensions based on the known dimensions of the markings and known positions of the first camera unit, the second camera unit and the third camera unit by: acquiring a plurality of images of the object using the first camera unit, the second camera unit, and the third camera unit, wherein the object has a first end and a second end; calculating a plurality of two-dimensional line equations based on the plurality of images; calculating a three-dimensional line equation based on the plurality of two-dimensional line equations; determining the first end and/or the second end of the object in each of the plurality of images; and determining coordinates of the object in three dimensions based on determining the first end and/or the second end of the object in the plurality of images. In some embodiments, the one or more processors are configured to calculating the plurality of two-dimensional line equations by: converting color images to gray tone, applying a derivative filter to gray-tome images, subtracting background in images, detecting key points to identify the object in images, and refining an initial line equation based on detecting the key points; the device is a stick, and the stick comprises: a first end, a second end opposite the first end, a first marking nearer the first end than the second end for imaging by the first camera unit and the second camera unit, and a second marking between the first marking and the second end for imaging by the first camera unit and the second camera unit; the stick has a length equal to or greater than 0.5 meters and equal to or less than 1.5 meters; and/or each template of the first set of templates has a width, and the width is equal to or greater than one pixel and equal to or less than 20 pixels.

In some embodiments, a method for providing position and orientation of an object at a worksite comprises acquiring three or more images of the object using three or more imaging devices, wherein the object comprises markings of known dimensions; calculating a plurality of two-dimensional line equations from the three or more images; calculating a three-dimensional line equation from the plurality of two-dimensional line equations; determining a first point and/or a second point on the object in the three or more images based on the three-dimensional line equation and the known dimensions of the markings; and determining coordinates of the object in three dimensions using the first point and/or the second point of the object in the three or more images. In some embodiments, calculating the plurality of two-dimensional line equations comprises: converting color images of the three or more images to gray tone, applying a derivative filter to the three or more images, subtracting background from the three or more images, detecting key points to identify the object, and refining an initial line equation; calculating the three-dimensional line equation comprises: generating plane coordinates of multiple planes based on the two-dimensional line equations, determining an intersection of the multiple planes in three dimensions, checking for residual two-dimensional line equations, and determining a final three-dimensional line equation; and/or determining the first point and/or the second point comprises: projecting a three-dimensional line equations onto each image of the three or more images, extracting pixels under the three-dimensional line equation projected onto each image, matching a line image with a predefined template, and acquiring the first point and/or the second point on the three or more images. In some embodiments, a memory device comprises instructions that cause one or more processors to perform one or more steps.

Further areas of applicability of the present disclosure will become apparent from the detailed description provided hereinafter. It should be understood that the detailed description and specific examples, while indicating various embodiments, are intended for purposes of illustration only and are not intended to limit the scope of the disclosure.

BRIEF DESCRIPTION OF THE DRAWINGS

The present disclosure is described in conjunction with the appended figures.

Figure 1:
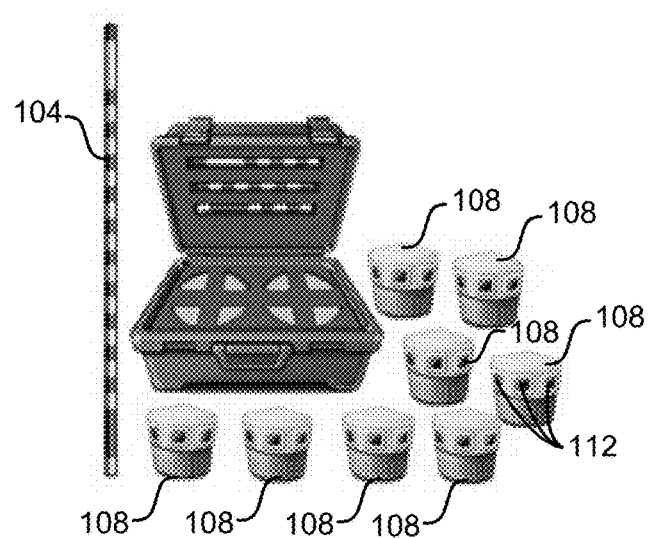
FIG. 1 depicts a simplified drawing of an embodiment of a camera system with a measurement stick.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

While an interior of a building is being finished, connectors, anchors, and the like are attached to the floors, ceilings, and other structures in the building. Further, cuts are made and holes drilled using power saws and drills. Tools, such as special power tools, are used at predetermined locations, such that the tools are operated at numerous, precisely-defined positions in the building. For example, nail guns, power saws, powder anchor tools, and the like are used to nail, cut, install fasteners, and perform other operations at predetermined points within the building with little error. In many buildings, a large number of electrical, plumbing, and HVAC components are sited and installed, usually with power tools. Additionally, finishing a building interior also uses a number of different tools that are not powered, which are also operated at precisely defined positions, such as for example reinforcement bar scanners. Positioning both power tools and non-power tools quickly and with precision (e.g., with respect to surrounding walls, ceilings, and floors) can save time and reduce construction costs. A significant amount of labor is used to lay out various construction points at such a construction site. Teams of workers have been used to measure and mark predetermined locations. It will be appreciated that this process has been subject to errors, resulting from measurement mistakes and from accumulated errors. Further, the cost using teams of workers to complete a layout process, and the time needed to perform the layout process, have both been significant.

Various location determining systems, including systems that incorporate one or more robotic total stations, have been used for building layout. The total station in such a system, positioned at a fixed, known location, directs a beam of laser light at a retro-reflective target. As the target moves, robotics in the total station cause the beam of light to track the target. By measuring the time of travel of the beam from the total station to the retro-reflective target and then back to the total station, the distance to the target is determined. The directional orientation of the beam to the target is also measured. Since dimensional coordinates of the total station are known, the dimensional coordinates of the retro-reflective target can easily be determined. Based on the measured position of the retro-reflective target, and the desired position of some building feature, such as a drilled hole, or a fastener, the operator can move the reflector to the desired position, and mark the position. Although position determination systems, such as ranging radio systems and robotic total station systems, can facilitate and speed the layout process, the layout process has continued to be lengthy, tedious, and expensive. In some embodiments, systems and/or methods are described to speed up, reduce manual labor, and/or reduce expense of construction.

System Configuration

Referring first to FIG. 1, a simplified drawing of an embodiment of a camera system with a measurement stick 104 is shown. The camera system comprises camera units 108, a main processing computer, the measurement stick 104, and/or a calibration target. The camera system comprises three or more camera units 108. In some embodiments, the camera system comprises two or more measurement sticks 104, two or more calibration targets, and/or two or more main processing computers.

Each camera unit 108 comprises a processor unit, a communication device, and one or more imaging devices 112. The imaging devices 112 each have a position and/or orientation that is known relative to other imaging devices 112 that are part of a camera unit 108. The imaging devices 112 acquire image sequences. The processor unit in the camera unit 108 processes the image sequences. The communication device transmits and receives data with the main processing computer.

Figure 2:
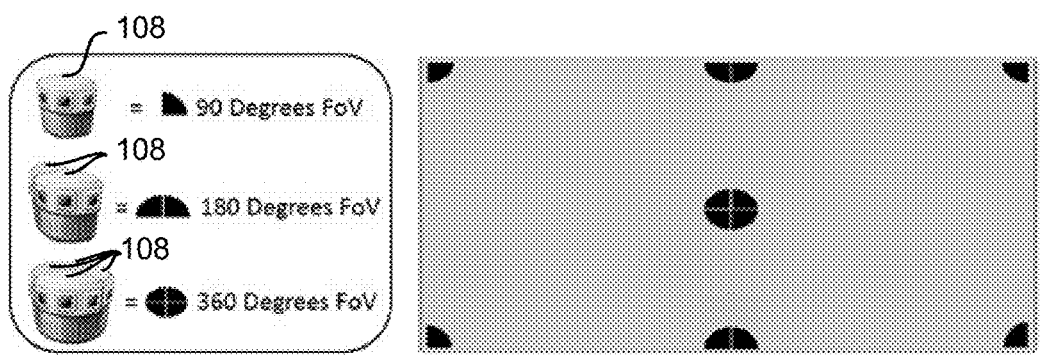
FIG. 2 depicts a simplified drawing of an embodiment of a configuration of camera units at a worksite.

In FIG. 2, a simplified drawing of an embodiment of a configuration of camera units 108 at a worksite is shown. An operator attaches camera units 108 to a column, wall, etc. A position of the camera unit 108 is not surveyed. The operator can add or subtract camera units 108 depending on a size of the worksite and/or a position of the camera unit 108.

Each camera unit 108 has a field of view (FoV). In some embodiments, the FoV of a camera unit 108 is 90 degrees+/−2%, 5%, 10%, 15%, and/or 20%. Two camera units 108 are combined for a 180 degree FoV. Three camera units 108 are combined for a 270 degree FoV. Four camera units 108 are combined for a 360 degree FoV. In some embodiments, each camera unit 108 has a FoV equal to 30, 36, 40, 45, 51, 60, 72, 180, 270, or 360 degrees+/−5%, 10%, and/or 15%. An operator can put two camera units 108 together to cover 180 degrees and four camera units 108 for 360 degrees. In some embodiments, camera units 108 are removably connected to each other (e.g., to have a combined field of view). In some embodiments, camera units 108 are removably connected to each other using pressure fit, interlocking parts, magnets, hook and loop, and/or snaps.

Figure 3:
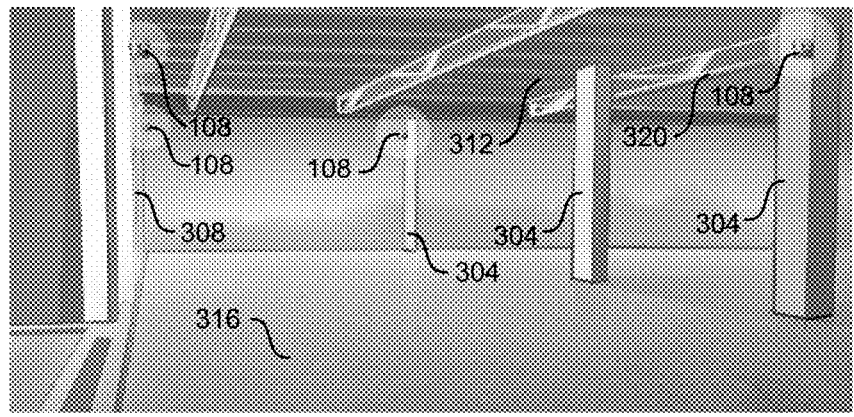
FIG. 3 depicts a simplified perspective drawing of an embodiment of camera units placed in a worksite.

FIG. 3 depicts a simplified perspective drawing of an embodiment of camera units 108 placed in a worksite. The operator attaches the camera units 108 to a column 304, wall 308, ceiling 312, floor 316, truss 320, etc. Camera units 108, which are modular, allow for quick setup. In some embodiments, no surveying of camera unit 108 locations is used.

Rapid Deployment Camera (Camera Positioning)

Figure 4:
FIG. 4 depicts example images with marked points on the images of a calibration target moved by an operator.

In FIG. 4, example images with marked points on the images of a calibration target 404 moved by an operator is shown. In some embodiments, one or more operators walk around the worksite with calibration targets 404. The camera units 108 detect (e.g., automatically) the calibration target 404 (e.g., in real-time). The camera units 108 in combination with the main processing computer calculate positions and orientations of imaging devices 112 of camera units 108 while removing (e.g., automatically) outliers. In some embodiments, a bundle adjustment technique with RANSAC (random sample consensus) is used. The "235" on the figure is a number counting how many points have been used to determine relative positions of the camera units 108. In the figure, there have been two-hundred, thirty-five positions of the target's position in three dimensions were calculated and used for determining relative positions of the camera units 108.

Positions and/or orientations of camera units 108 are calculated based on the marked points. However, there are sometimes false results (which are not the calibration target 404) because of lighting condition, occlusion, and etc. Thus, in some embodiments, false-detection results of the marked points are removed before calculating the positions and/or orientations of the camera units 108. To remove a false-detection result, a pair of camera units 108 identifies inliers (which are correct detections of the calibration target 404) among marked points by fitting to a relative orientation model using a RANSAC algorithm. Inliers are marked points of the calibrated target using the camera units 108, wherein the positions and/or orientations of the pair of camera units 108 is in an arbitrary coordinate system. Inliers are identified using other pairs of camera units 108. Inliers from one pair of camera units 108 are matched to inliers from another pair of camera units 108. A bundle adjustment with a RANSAC algorithm is run using matched inliers and positions and/or orientations of the camera units 108, wherein the arbitrary coordinate system is used as initial values. In some embodiments, similar features are matched in image sequences to a Building Information Model (BIM) to calculate positions and/or orientations of the camera units 108. In some embodiments, the similar features are distinct.

Measurement Stick

Figure 5:
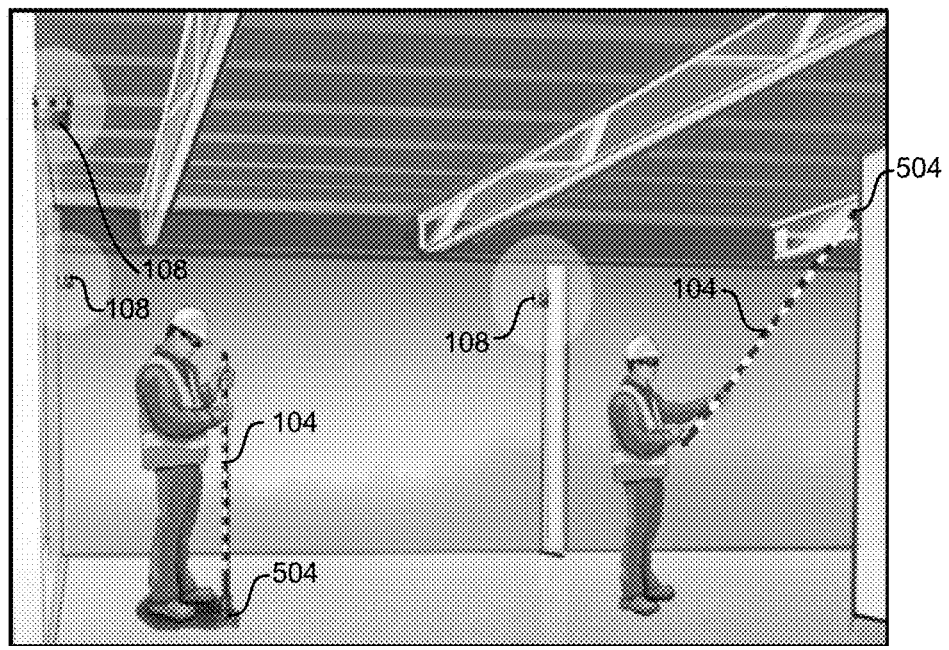
FIG. 5 depicts a simplified perspective drawing of example measurement stick applications.

FIG. 5 depicts a simplified perspective drawing of an example of measurement stick 104 applications. Accurate 3D position of a tip 504 of the measurement stick 104 in real-time can be made. To measure a point, an operator holds the measurement stick 104 for a few seconds. Multiple measurement sticks 104 can work at same time.

Figure 6:
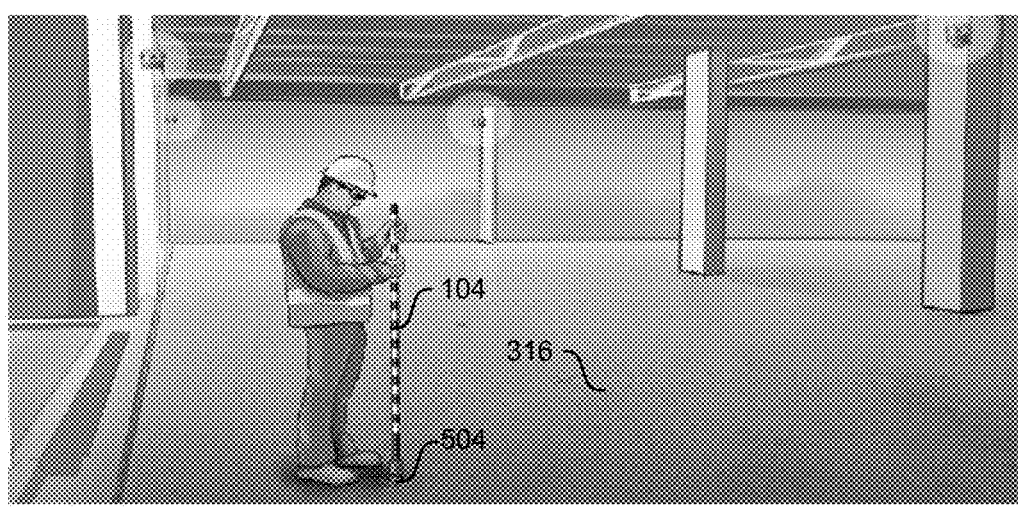
FIG. 6 depicts a simplified perspective drawing of an example of a measurement stick used for layout and/or marking a location on a floor.
Figure 7:
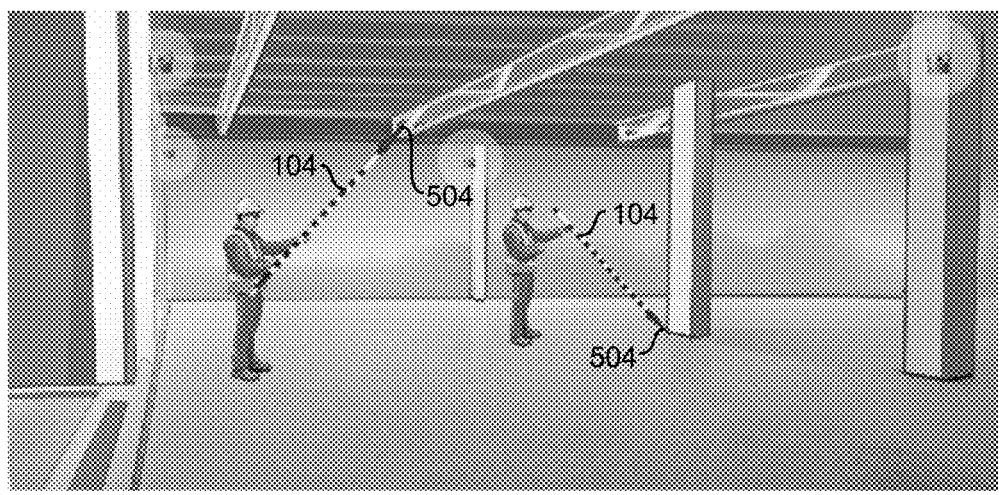
FIG. 7 depicts a simplified perspective drawing of an example of measurement sticks used for point measurements for quality check documentation.
Figure 8:
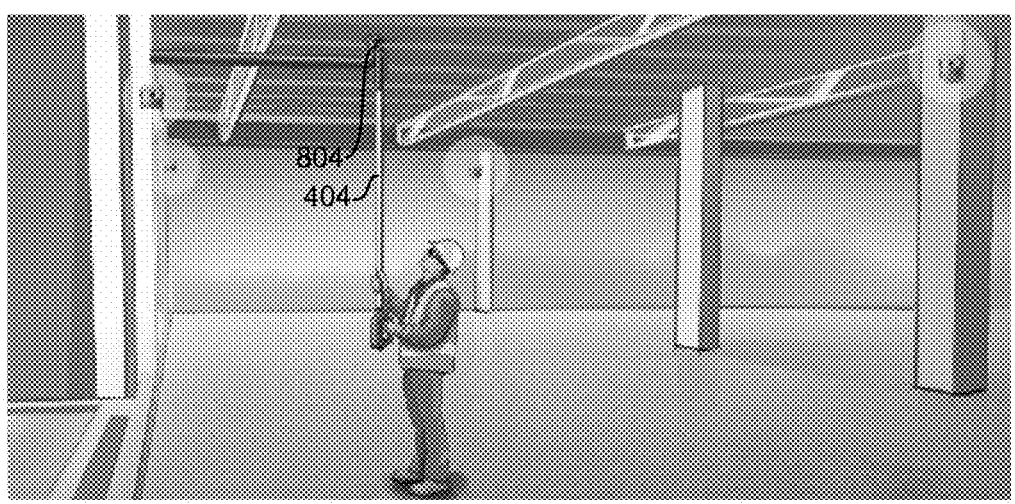
FIG. 8 depicts a simplified perspective drawing of an example of a measurement stick for placing firestop.
Figure 9:
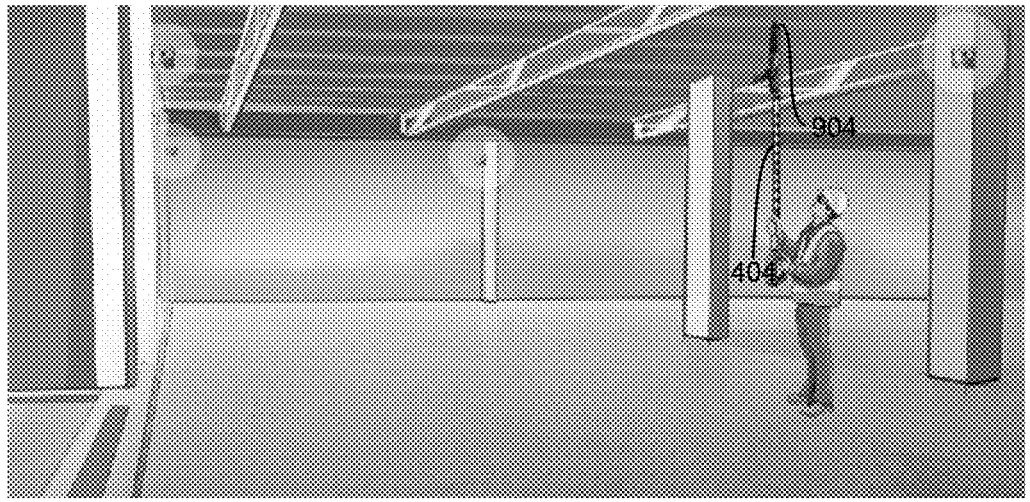
FIG. 9 depicts a simplified perspective drawing of an example of a measurement stick used for direct fastening.

The measurement stick 104 can be used for layout/marking location on the floor 316 (FIG. 6), point measurement for quality check documentation (FIG. 7), firestop placement by attaching a dispenser 804 to the measurement stick 104 (FIG. 8), direct fastening by attaching a direct fastener 904 to the measurement stick 104 (FIG. 9), and etc.

In some embodiments, the measurement stick 104 has a black and white stripe pattern so that the measurement stick 104 is recognizable by camera units 108 and/or the main processing computer. The camera unit 108 detects distinct points on the measurement stick 104 and then fits the points to a line.

An orientation of the measurement stick 104 is determined from lines calculated by each camera unit 108. A perspective center of an imaging device 112 and a line on an image plane of the imaging device 112 provides a plane. The orientation of the measurement stick 104 is calculated by an intersection of planes from the imaging devices 112. Since a length of the measurement stick 104 is known, once one end point of the measurement stick 104 is detected, the system can calculate a 3D position of the tip 504 of the measurement stick.

Tool Tracking

Figure 10:
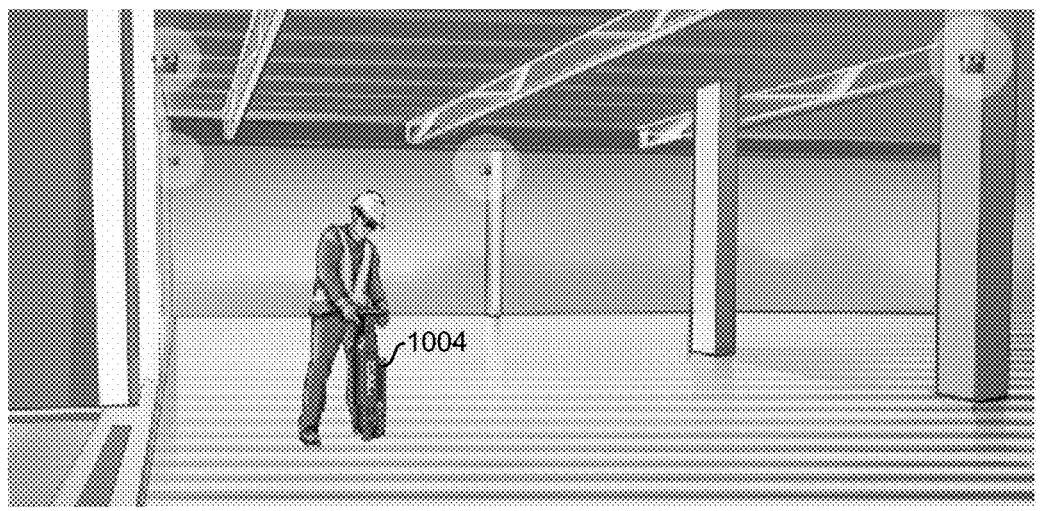
FIG. 10 depicts a simplified perspective drawing of an example of direct fastening on pan decking.
Figure 11:
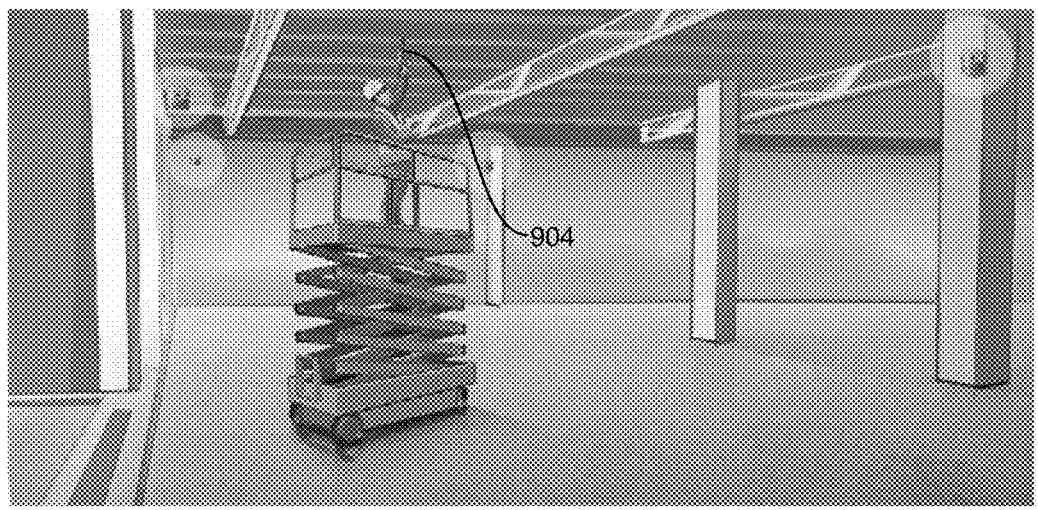
FIG. 11 depicts a simplified perspective drawing of an example of drilling or direct fastening on a ceiling while a user is on a scissor lift.

FIG. 10 depicts a simplified perspective drawing of an example of direct fastening on Pan-Decking. FIG. 11 depicts a simplified perspective drawing of an example of drilling or direct fastening on a ceiling while a user is on a scissor lift. The main computer processor is capable of finding and tracking various tools 1004 (e.g., construction tools). System memory may include data defining a digital image and/or dimensions of each of a plurality of tools 1004 so that the main computer processor can distinguish between the plurality of tools 1004 used. In some embodiments, a position and/or orientation of a tool 1004 is determined based on a recognition of an overall three-dimensional image of the tool 1004 and/or on certain features of the tool 1004. In some embodiments, certain features of the tool 1004 are added to the tool 1004 for a purpose of determining the position and/or orientation of the tool 1004. In some embodiments, certain features of the tool 1004 are built into the tool 1004 for a purpose other than for determining the position and/or orientation of the tool 1004.

Personnel Monitoring

Figure 12:
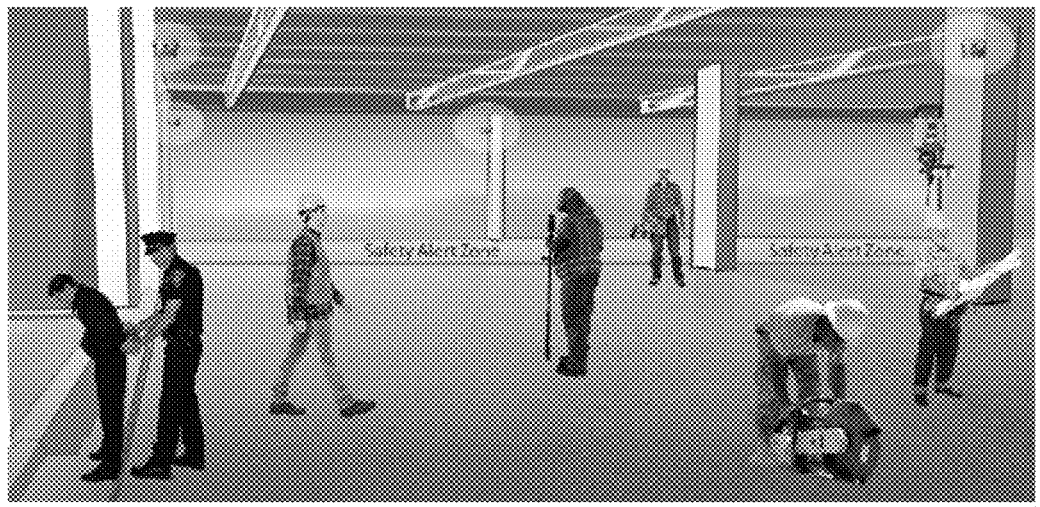
FIG. 12 depicts a simplified perspective drawing of an example of camera units used for personnel monitoring for safety and security.

FIG. 12 depicts a simplified perspective drawing of an example of camera units used for personnel monitoring for safety and security. In some embodiments, the main computer processor is configured to identify and track people. Thus camera units 108 can be used as a surveillance system for safety and/or security. For example, an alarm could sound if a person entered a safety-alert zone; or a user of a tool could be alerted that another person is within an unsafe distance of the tool. In some embodiments, camera units 108 acquire images throughout the day to form a history of images. The history of images can be used for tracking work, verifying work is completed, and/or logging events to video (e.g., for quality control, paying contractors, security, etc.). In some embodiments, daily and/or hourly documentation is recorded.

Self-Realigning Camera

In some embodiments, unintentional and/or intentional movement of a camera unit 108 can be detected. Calculated values of positions and/or orientations of camera units 108 are important for accurate positioning of objects. However, camera units 108 can be moved for various reasons (such as a worker or tool accidentally bumps the camera unit 108). A moving object can be differentiated from a background in an image sequence. If a camera unit 108 remains stationary, then the background remains stationary in the image sequence. If a camera unit 108 moves, then all objects, including the background, moves. If the background is determined to have moved, whether or not a camera unit 108 has moved can be tested by comparing distinct features from previously recorded images and compare to a current image of the camera unit 108. If the position of the camera unit 108 has changed, then the position and/or orientation of the camera unit 108 (and possibly other camera units 108) will be recalculated (e.g., using distinct features that have 3D coordinates; or using a calibration target). In some embodiments, 3D coordinates of distinct features are calculated during after initial calibration of the camera units 108.

Measurement Stick Detection

Figure 13A:
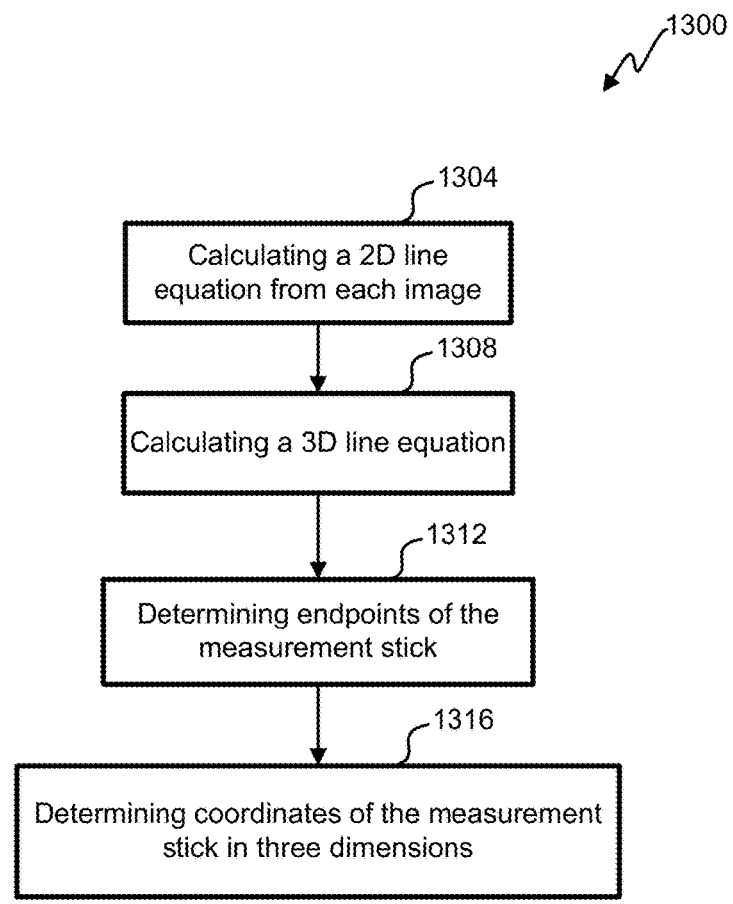
FIG. 13A illustrates a flowchart of an embodiment of a process for calculating coordinates of the measurement stick in three dimensions.

Referring next to FIG. 13A, a flowchart of an embodiment of a process 1300 for calculating coordinates of the measurement stick in three dimensions is shown. Process 1300 begins in step 1304 with calculating a two-dimensional line equation from each image of a plurality of images (e.g., two or more images or three or more images). The plurality of images are acquired by a plurality of imaging devices 112 (e.g., two or more imaging devices 112 or three or more imaging devices 112) in a plurality of camera units 108 (e.g., in two or more camera units 108 or in three or more camera units 108). In step 1308, a three-dimensional line equation is calculated based on the two-dimensional line equations. An endpoint of the measurement stick 104 is determined based on the three-dimensional line equation and at least one image of the plurality of images, step 1312. In step 1316, coordinates of the measurement stick 104 are determined in three dimensions based on determining the endpoint in the at least one image. Further details to steps 1304, 1308, 1312, and 1316 are provided below.

Figure 13B:
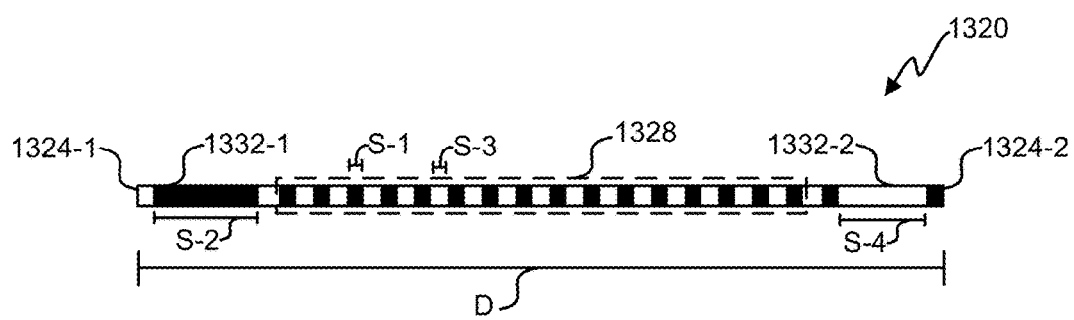
FIG. 13B depicts a simplified drawing of an embodiment of a stick.

FIG. 13B depicts a simplified drawing of an embodiment of a stick 1320 (e.g., to be used as the measurement stick 104). The stick 1320 is an elongated device defined by a length, D, and a width (e.g., a diameter; the width being between greater than 0.5 cm and less than 18 cm; length D is greater than 0.25 meters and less than 4 meters and/or length D is equal to or greater than 0.5 meters and equal to or less than 1.5 meters). The stick 1320 comprises a first end 1324-1 and a second end 1324-2. The first end 1324-1 is separated from the second end 1324-2 by the length D. The stick 1320 comprises first markings, central markings 1328, and second markings, end markings 1332.

The central markings 1328 comprise a plurality of high contrast regions. In the embodiment shown, the central markings 1328 comprise alternating white regions and black regions. In some embodiments a repeating pattern is used. The black regions of the central markings 1328 each have a first span S-1 (e.g., a first length). The end markings 1332 have a second span S-2 (e.g., a second length). The second span is different from the first span S-1. The white regions of the central markings 1328 have a third span S-3 (e.g., a third length). In some embodiments, the third span S-3 is equal to the first span S-1. In some embodiments, there is a first end marking 1332-1 and a second end marking 1332-2. The first end-marking is the first span S-1 and the second end marking 1332-2 has a fourth span S-4 (e.g., a fourth length). In some embodiments S-4=S-1. In some embodiments, S-4 is not equal to S-1 and/or S-4 is a different color than S-1 to differentiate between the first end 1324-1 of the stick 1320 and the second end 1324-2 of the stick 1320.

Figure 14:
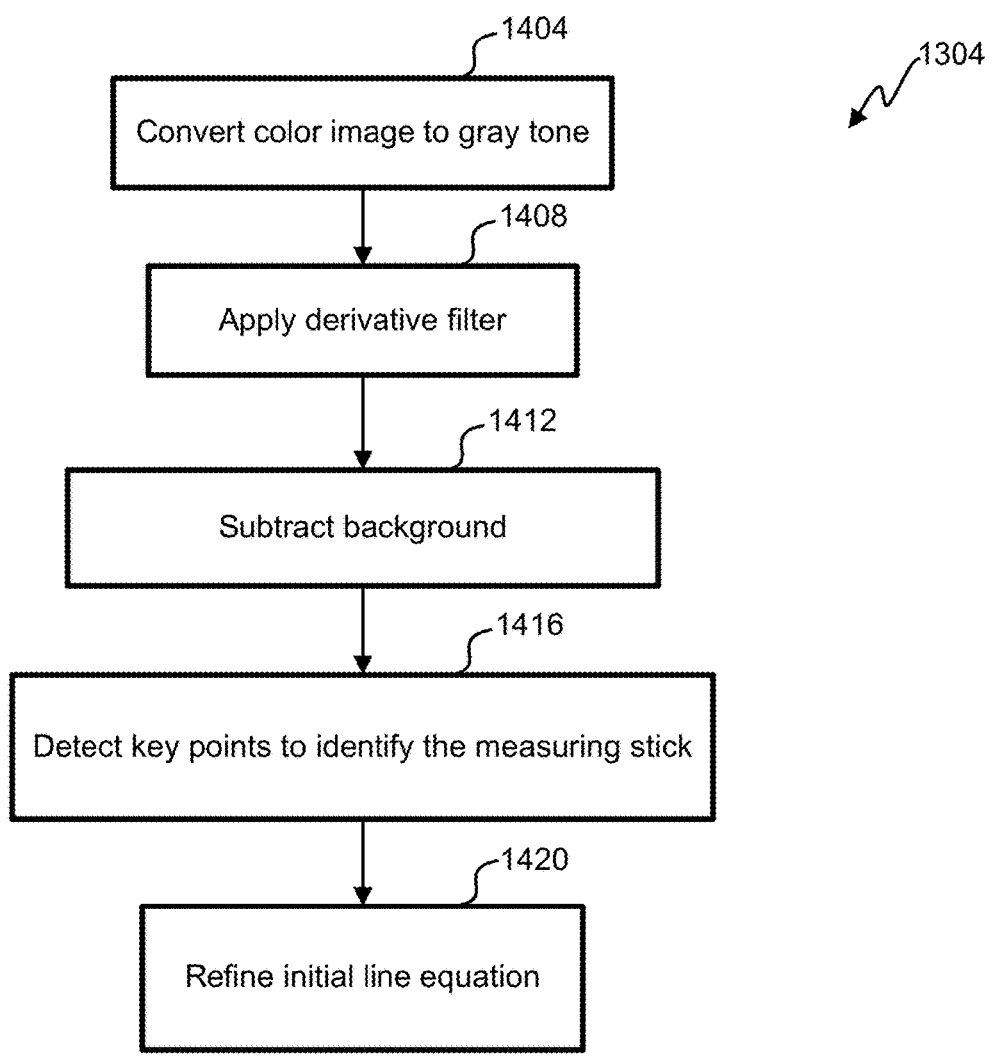
FIG. 14 illustrates a flowchart of an embodiment of a process for calculating a 2D line equation from each image.

FIG. 14 illustrates a flowchart of an embodiment of a process for calculating the 2D line equation from an image. The process for calculating the 2D line equation from each image begins in step 1404 with changing a color image to a gray image (or obtaining a gray image). For example, a red/green/blue (RGB) image is converted to a gray-tone image. In some embodiments, a Gaussian filter is applied after converting the image to the gray-tone image (e.g., to reduce noise).

In step 1408 a derivative filter is applied to the gray-tone image to produce a derivative image. In some embodiments, the derivative filter is a Laplacian filter. In the derivative image, edges are easier to identify. Edges are areas where pixel values change rapidly (sometimes referred to as "corners").

A background is subtracted, step 1412, to produce a foreground image. For example, a background is subtracted from the derivative image to identify a foreground area. The foreground area is a part of an image that has a moving object (e.g., stick 1320). There can be more than one foreground area of the foreground image (e.g., for two targets, a first foreground area with the first target is not contiguous with a second foreground area of the image with the second target). In some embodiments, a median filter is applied to the foreground image. In some embodiments, the median filter is applied to reduce sparsely occurring white and black pixels (salt-and-pepper noise).

In step 1416, key points are detected to identify the stick 1320. In some embodiments, a FAST (Features from Accelerated Segment Test) algorithm, such as detectFASTFeatures in MATLAB (9.1; R2016b), is used for edge detection. Black regions and white regions of the central markings 1328 on the stick 1320 are detected as key points. Key points are fitted to an initial line equation. In some embodiments, RANSAC is used to fit key points to the initial line equation because RANSAC discards outliers.

In some embodiments, the initial line equation is optionally refined, step 1420. For example, if the stick 1320 is too close to an imaging device 112, the initial line equation might be a little inaccurate. In some embodiments, to refine the initial line equation, black and white stripe areas (e.g., images of black regions and white regions of the central markings 1328) on the gray image are identified by: using the initial line equation, identifying quad shapes (e.g., one quad shape per black region or white region of the central markings 1328) near the initial line equation, and calculating average and/or standard deviation of pixel values inside the quad shapes to find stripes. Centroids of the quad shapes, which are determined to be images of central markings 1328, are calculated. For example, centroids are fit to a line using RANSAC to calculate the 2D line equation. The 2D line equation in each image of the plurality of images is calculated, if the 2D line equation exists.

Figure 15:
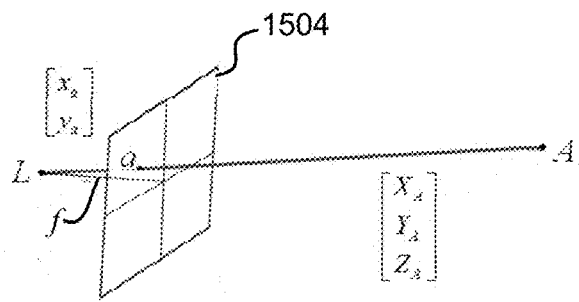
FIG. 15 depicts a simplified drawing of the collinearity condition.

In step 1308 of FIG. 13, a three-dimensional line equation is calculated. In some embodiments a collinearity condition, sometimes referred to as collinearity equations, is used in calculating the three-dimensional line equation. FIG. 15 depicts a simplified drawing of the collinearity condition. The collinearity condition represents a geometric relationship wherein a point (A) in an object space, an image of the point (a) on an image plane 1504, and a perspective center (L) of the image plane 1504 are on a straight line in three-dimensional space.

The collinearity condition can be expressed by the following equations:

$$x_a = x_o - f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$
$$= x_o - f\frac{r}{q}$$

$$y_a = y_o - f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$
$$= y_o - f\frac{s}{q}$$

In the above equations, $x_a$ and $y_a$ are coordinates of the image of the point (a) (sometimes referred to as photo coordinates); $x_o$ and $y_o$ are coordinates of the principal point (the principal point is the point on the image plane 1504 onto which the perspective center (L) is projected); f is a focal length of a camera (e.g., of an imaging device 112); $X_L$, $Y_L$, and $Z_L$ are object space coordinates of the perspective center L; $X_A$, $Y_A$, and $Z_A$ are object space coordinates of point A; and the m's are functions of the three rotation angles ($\omega$, $\varphi$, and $\kappa$) such that:

$m_{11} = \cos\varphi \cos\kappa$ $m_{12} = \sin\omega \sin\varphi \cos\kappa + \cos\omega \sin\kappa$ $m_{13} = -\cos\omega \sin\varphi \cos\kappa + \sin\omega \sin\kappa$ $m_{21} = -\cos\varphi \sin\kappa$ $m_{22} = -\sin\omega \sin\varphi \cos\kappa + \cos\omega \sin\kappa$ $m_{23} = \cos\omega \sin\varphi \cos\kappa + \sin\omega \sin\kappa$ $m_{31} = \sin\varphi$ $m_{32} = -\sin\omega \cos\varphi$ $m_{33} = \cos\omega \cos\varphi$ Since the collinearity equations are nonlinear, the linearized forms of the equations are used to iteratively solve many photogrammetric solutions. The collinearity equations can be linearized by using Taylor's theorem. In this manner, the collinearity equations can be written as follows (simplified):

$$J = b_{32}d\omega + b_{12}d\varphi + d_{13}d\kappa - b_{14}dX_L - b_{13}dY_L - b_{16}dZ_L + b_{14}dX_A + b_{15}dY_A + b_{16}dZ_A + e_{s_o}$$

$$K = b_{31}d\omega + b_{22}d\varphi + d_{23}d\kappa - b_{24}dX_L - b_{23}dY_L - b_{26}dZ_L + b_{24}dX_A + b_{25}dY_A + b_{26}dZ_A + e_{s_o}$$

Figure 16:
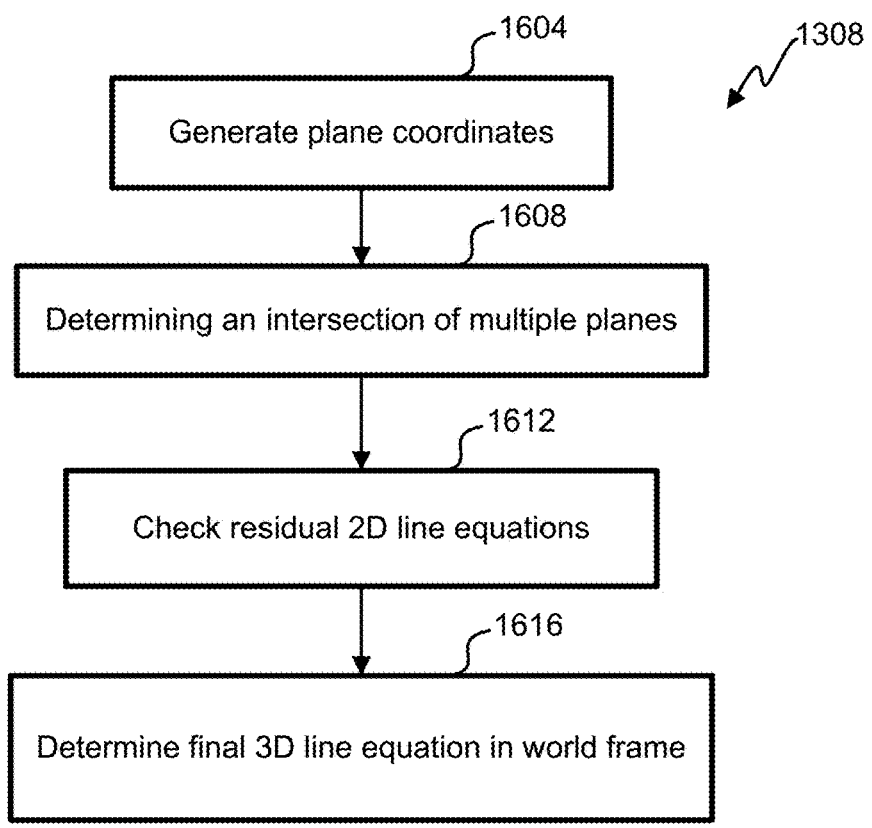
FIG. 16 illustrates a flowchart of an embodiment of a process for calculating a three-dimensional line equation.

FIG. 16 illustrates a flowchart of an embodiment of a process for calculating the three-dimensional line equation (step 1308 of FIG. 13). For each 2D line equation, plane coordinates are generated. Plane coordinates are generated by determining a plane defined by the 2D line equation and the perspective center L of an imaging device that acquired an image that the 2D line equation is based on.

In step 1608, an intersection of multiple planes is determined. Plane coordinates of multiple planes (e.g., from multiple cameras) are calculated in object space. The intersection of the multiple planes determines an initial 3D line equation. The initial 3D line equation is an equation of a line in object space (thus the initial 3D line equation is an equation of a line in three-dimensional space). In some embodiments, the initial line equation is used as the 3D line equation.

In step 1612, residual 2D line equations are checked to find wrong 2D line equations. Residual 2D line equations are determined by planes formed from 2D line equations that fail to intersect with two or more other planes and/or fail to intersect within a certain tolerance of the initial 3D line equation (e.g., within 0.5, 0.25, 0.1, or 0.07 meters of the initial line equation; and/or two or more sticks 1320 are not operated within 0.5 meters of each other). For example, a first camera unit 108-1, a second camera unit 108-2, a third camera unit 108-3, and a fourth camera unit 108-4 are used to acquire images of the stick 1320. The first camera unit 108-1, the second camera unit 108-2, the third camera unit 108-3, and the fourth camera unit 108-4 are time synced to acquire images at the same time. The first camera unit 108-1, the second camera unit 108-2, and the third camera unit 108-3 each calculate two 2D line equations in an image. The fourth camera unit 108-4 calculates three 2D line equations in an image. Plane coordinates are calculated, and two initial 3D line equations are determined based on intersecting planes. Though the plane formed by a third 2D line equation from the fourth camera unit 108-4 intersects with planes formed with 2D line equations from other camera units 108, there is not an intersection of at least three planes corresponding to the third 2D line equation of the fourth camera unit 108-4; thus the third 2D line equation is thrown out as an error. The system determines that there are two sticks 1320 being observed based on determining two 3D line equations. In some embodiments, three or more camera units 108 are used to observe an area so that two or more measuring sticks 1320 can be used within the area and residual 2D line equations can be identified and removed. If only two camera units 108 are used, it is difficult to identify and remove residual 2D line equations because two planes formed by two 2D line equations will usually intersect, even if one of the two 2D lines are residual.

In step 1616, the final 3D line equation is determined. For example, a first intersection of a first plane corresponding to the first camera unit 108-1 and a second plane corresponding to the second camera unit 108-2 is close to, but does not perfectly overlap (e.g., within 0.1 or 0.05 meter of each other), a second intersection of the first plane and a third plane corresponding to the third camera unit 108-3. Similarly, a third intersection of the second plane and the third plane may not perfectly overlap the first intersection or the second intersection, but be close defined by the certain tolerance (e.g., within 0.1 meters of each other). In some embodiments, the first intersection, the second intersection, and the third intersection are averaged to determine the final 3D line equation (e.g., having removed outlying intersections in step 1612). In some embodiments, a rolling tolerance is used. For example, if three later measurements are within the tolerance (e.g., 0.05 meters) of measurement being determined, then the measurement being determined is used.

In some embodiments, the method further comprises displaying to a user a number of calculated positions of the target as the calculated positions are made. Displaying to the user the number of calculated positions of the target changes in color and/or style based on the number of calculated positions. In some embodiments, the method further comprises displaying to a user calculated positions and/or orientations of a target. In some embodiments, the display is a monitor; and/or part of a hand-held device, a head-mount device, a helmet-mount device, or glasses.

Figure 17A:
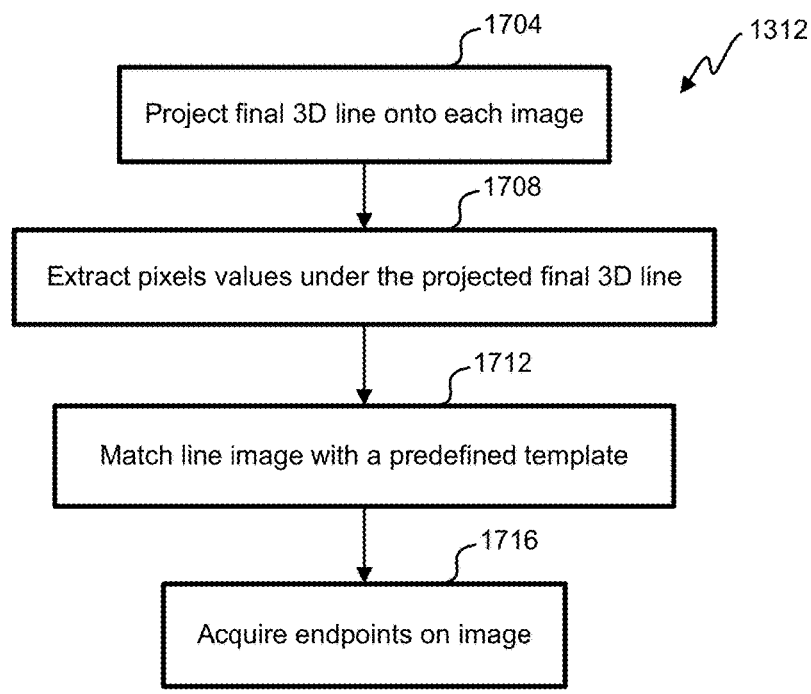
FIG. 17A illustrates a flowchart of an embodiment of a process for determining an endpoint, in two dimensions, of a measurement stick.

FIG. 17A illustrates a flowchart of an embodiment of a process for determining an endpoint of the measurement stick 104 in an image (step 1312 of FIG. 13). In some embodiments, the endpoint is determined in two or more images and/or from two or more imaging devices. In some embodiments, both endpoints of the measurement stick 104 are determined. In step 1704, the final 3D line equation is projected back into an image-coordinate system (e.g., using the collinearity equations). Thus a projected line is formed on the image. The projected line matches closely (e.g., within a given tolerance) to the 2D line equation in the image. In some embodiments, if the projected line does not match close to the 2D line equation in an image (e.g., within a given tolerance), then that image is not used. In some embodiments, the 2D line equation and the 3D line equation have undetermined lengths (e.g., they are equations of lines that can extend to infinity).

In step 1708, pixel values are extracted under the projected final 3D line on the image to make a line image. The pixel values of the line image, over some length) are alternating dark and light values. In some embodiments, the line image has a 1 pixel height and can vary in length.

Figure 17B:
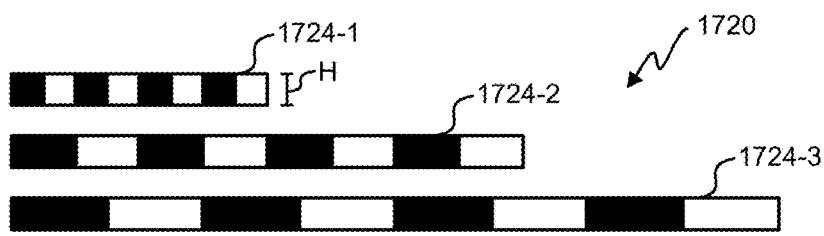
FIG. 17B depicts a simplified drawing of an embodiment of a subset of a first set of templates.

The line image is matched with a first set of templates 1720, step 1712, to determine a scale. The first set of templates are 1 pixel in height and have stripe patterns to fit to the central markings 1328. In some embodiments, each template of the first set of templates has a height equal to or greater than one pixel and equal to or less than 50, 25, 20, 15, 10, or 5 pixels. FIG. 17B provides a simplified drawing of an embodiment of a subset of the first set of templates 1720. The subset of the first set of templates comprises a first central template 1724-1, a second central template 1724-2, and a third central template 1724-3. The central templates 1724 have a height, H. Each central template 1724 corresponds to a different scale. In some embodiments, the height, H, is one pixel. The line image is compared the central templates 1724 and matched with one of the central templates 1724. The central markings 1328 of the stick 1320 are known dimensions. A scale of the stick 1320 is determined based matching a central template 1724 to the line image of the stick 1320.

Figure 17C:
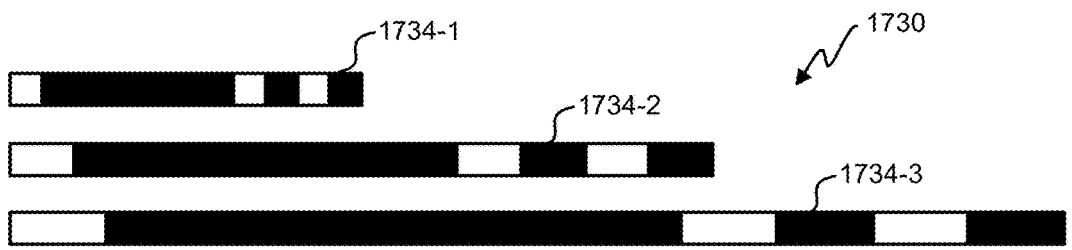
FIG. 17C depicts a simplified drawing of an embodiment of a subset of a second set of templates.

In step 1716, an endpoint on the image is acquired. FIG. 17C depicts a simplified drawing of an embodiment of a second set of templates 1730. The second set of templates comprises a plurality of end templates 1734. The end 1324 of the stick 1320 is identified in the image by selecting an end template 1734 of similar scale as the central template 1724. For example, a first end template 1734-1 is of similar scale to the first central template 1724-1; a second end template 1734-2 is of similar scale to the second central template 1724-2; and a third end template 1734-3 is of similar scale to the third central template 1724-3.

The end template 1734 that is selected is then compared to the line image to identify an end marking 1332 from the line image. The end marking 1332 is of known dimensions so that the end 1324 of the stick 1320 can be determined based on the end template 1734 compared to the line image. In some embodiments, the end templates 1734 are 1 pixel in height. In some embodiments, two endpoints are acquired. In some embodiments, two ends 1324 of the stick 1320 have different patterns (and in some embodiments use different end templates), thus which endpoint corresponds to which end 1324 can be determined. In some embodiments, a point, other than an endpoint, is determined. For example, instead of a determining the first endpoint and/or the second endpoint, a first point and/or a second point are determined. In some embodiments, the first end point is a point that is closer to the first end 1324-1 than the second end 1324-2, not necessarily an image of the first end 1324-1.

Figure 18:
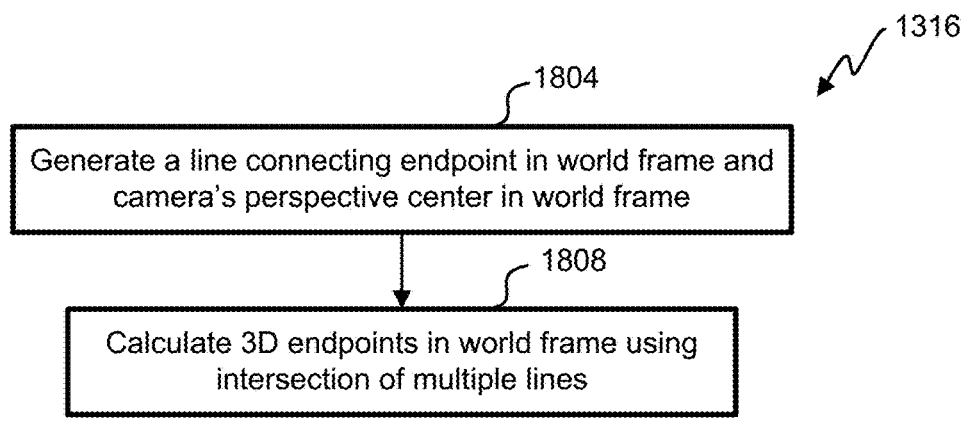
FIG. 18 illustrates a flowchart of an embodiment of a process for determining coordinates of the measurement stick in three dimensions.

FIG. 18 illustrates a flowchart of an embodiment of a process for determining coordinates of the measurement stick in three dimensions (step 1316 of FIG. 13). In step 1804 a line per image is generated connecting an endpoint in object space and the camera's perspective center in object space. In step 1808, an intersection of multiple lines is used to calculate an endpoint in world frame (e.g., using Space Intersection below). One or two endpoints of the measurement stick 104 are then acquired in three dimensions of the object space. In some embodiments, the 3D line equation is used mapping the endpoint from one image onto the 3D line equation.

Figure 19:
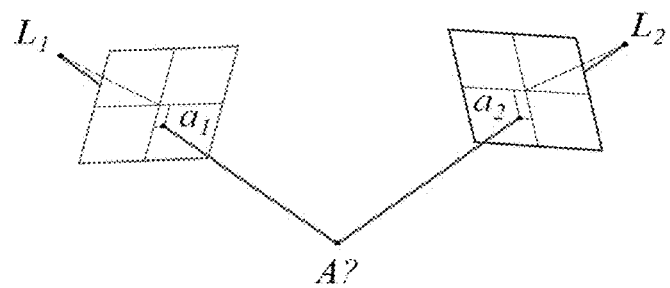
FIG. 19 illustrates the concept of space intersection.

Space Intersection. Space intersection is the photogrammetric process that estimates 3D coordinates of a point in the object space from photo coordinates observations in a stereo pair. FIG. 19 illustrates the concept of space intersection. Known values are the exterior orientation parameters of two photographs ($L_1$, $L_2$), photo coordinates of a point ($a_1$, $a_2$) in each photograph, and initial value for the point in object space (A). In some embodiments, the initial value for the point in object space (A) is determined by calculating a first vector starting at the perspective center of the first camera and to photo coordinates of a point on an image plane of the first camera; calculate a second vector for the second camera (e.g., starting at a perspective center of the second camera to a point on an image plane of the second camera); calculating an intersection of the first vector and the second vector, and if an intersection does not exist, finding a point near (e.g., closest point between) the first vector and the second vector.

The following equations shows the linearized form of the collinearity equations for space intersection. Since the exterior orientation parameters of each photograph are known, the object coordinate terms ($dX_A$, $dY_A$, $dZ_A$) are estimated iteratively in the linearized form of the collinearity condition equation.

$$J = b_{14}dX_A + b_{15}dY_A + b_{16}dZ_A + e_{x_o}$$

$$K = b_{24}dX_A + b_{25}dY_A + b_{26}dZ_A + e_{y_o}$$

The following equation shows the matrix form of the previous equations. Subscripts C0 and C1 represent cameras 0 and 1 (or photographs 0 and 1), respectively. The solution of the equation can be estimated iteratively using Least-square solution.

$$\begin{bmatrix} (J)_{c_0} \\ (K)_{c_0} \\ (J)_{c_1} \\ (K)_{c_1} \end{bmatrix} = \begin{bmatrix} (b_{14})_{c_0} & (b_{15})_{c_0} & (b_{16})_{c_0} \\ (b_{24})_{c_1} & (b_{25})_{c_0} & (b_{26})_{c_0} \\ (b_{14})_{c_1} & (b_{15})_{c_1} & (b_{16})_{c_1} \\ (b_{24})_{c_1} & (b_{25})_{c_1} & (b_{26})_{c_1} \end{bmatrix} \begin{bmatrix} dX_A \\ dY_A \\ dZ_A \end{bmatrix} + e$$

The following table shows the iterative space intersection algorithm.

Data: photo coordinate observations: $(x_a, y_a)_{c_0}, (x_a, y_a)_{c_1}$

Initial values of point $A$: $(X_A, Y_A, Z_A)$

While ($\|\xi\| >$ threshold)

Figure 20:
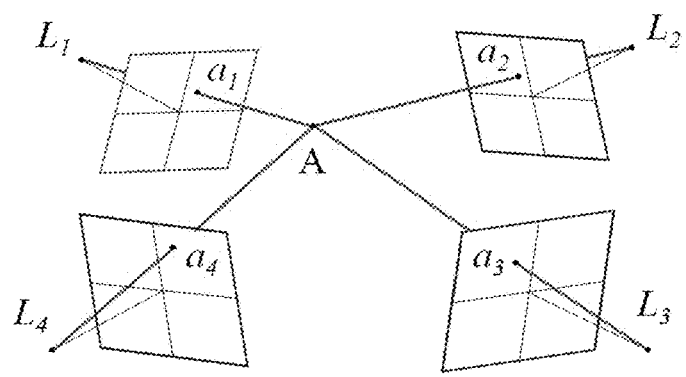
FIG. 20 illustrates the concept of space intersection for a multiple camera case.

Calculate design and $y$ matrix: $A = \begin{bmatrix} (b_{14})_{c_0} & (b_{15})_{c_0} & (b_{16})_{c_0} \\ (b_{24})c_0 & (b_{25})_{c_0} & (b_{26})_{c_0} \\ (b_{14})_{c_1} & (b_{15})_{c_1} & (b_{16})_{c_1} \\ (b_{24})_{c_1} & (b_{25})_{c_1} & (b_{26})_{c_1} \end{bmatrix}$ $y = \begin{bmatrix} (J)_{c_0} \\ (K)_{c_0} \\ (J)_{c_1} \\ (K)_{c_1} \end{bmatrix}$ Estimate parameter matrix: $\hat{\xi} = \begin{bmatrix} dX_A \\ dY_A \\ dZ_A \end{bmatrix} = (A^T A)^{-1} A^t y$ Update solution: $\begin{bmatrix} X_A \\ Y_A \\ Z_A \end{bmatrix} = \begin{bmatrix} X_A \\ Y_A \\ Z_A \end{bmatrix} + \begin{bmatrix} dX_A \\ dY_A \\ dZ_A \end{bmatrix}$ End Result: 3D object space coordinates of point $A$ Space intersection with multiple cameras. The bundle adjustment technique can be used to solve for the space intersection solution in the multiple camera case. FIG. 20 illustrates the concept of space intersection for the multiple camera case. Known values are the exterior orientation parameters of the cameras or photographs ($L_1$, $L_2$, $L_3$, and $L_4$), the photo coordinates of a point ($a_1$, $a_2$, $a_3$, and $a_4$), and the initial value for the point in object space (A) is a center of the object space.

The following equation shows matrix form of space intersection equation for the multiple camera case. In this equation, subscripts $C_0$, $C_1$, $C_2$ and $C_3$ represent cameras 0, 1, 2, and 3, respectively. Solution of equation can be estimated iteratively by using least-squares solution. The sizes of the design matrix and the observation matrix are 2n×3 and 2n×1, respectively; where n is the number of cameras (or photographs).

$$\begin{bmatrix} (J)_{c_0} \\ (K)_{c_0} \\ (J)_{c_1} \\ (K)_{c_1} \\ (J)_{c_2} \\ (K)_{c_2} \\ (J)_{c_3} \\ (K)_{c_3} \end{bmatrix} = \begin{bmatrix} (b_{14})_{c_0} & (b_{15})_{c_0} & (b_{16})_{c_0} \\ (b_{24})_{c_0} & (b_{25})_{c_0} & (b_{26})_{c_0} \\ (b_{14})_{c_1} & (b_{15})_{c_1} & (b_{16})_{c_1} \\ (b_{24})_{c_1} & (b_{25})_{c_1} & (b_{26})_{c_1} \\ (b_{14})_{c_2} & (b_{15})_{c_2} & (b_{16})_{c_2} \\ (b_{24})_{c_2} & (b_{25})_{c_2} & (b_{26})_{c_2} \\ (b_{14})_{c_3} & (b_{15})_{c_3} & (b_{16})_{c_3} \\ (b_{24})_{c_3} & (b_{25})_{c_3} & (b_{26})_{c_3} \end{bmatrix} \begin{bmatrix} dX_A \\ dY_A \\ dZ_A \end{bmatrix} + e$$

Figure 21:
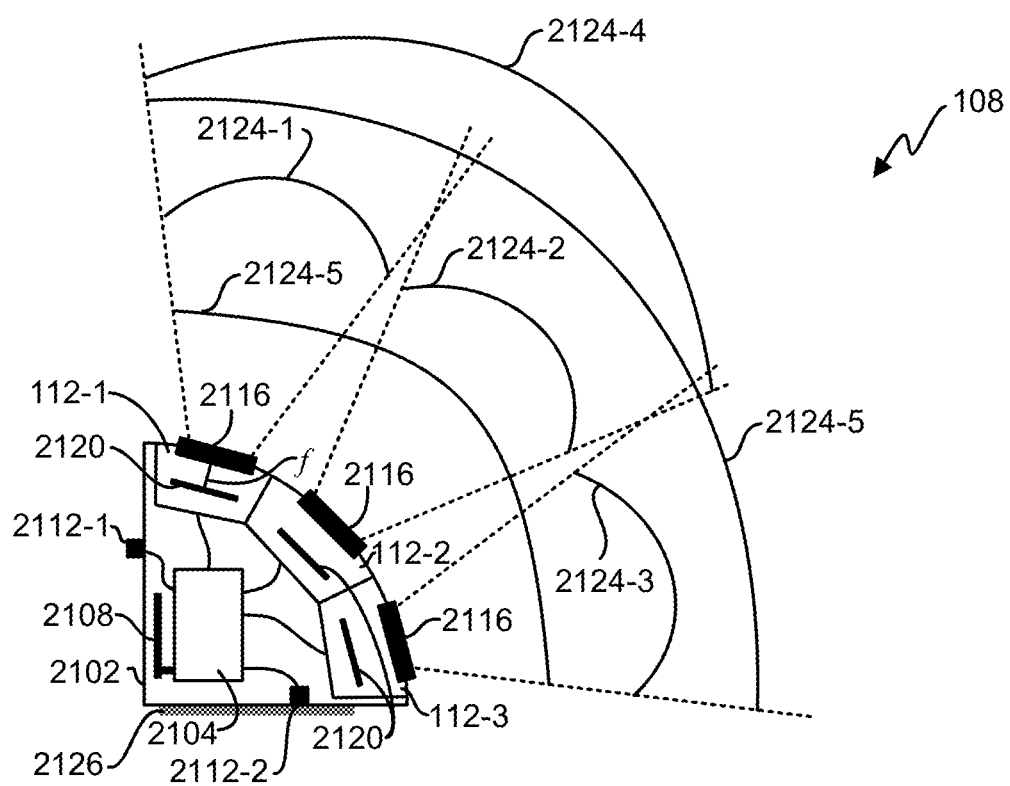
FIG. 21 illustrates a simplified diagram of an embodiment of a camera unit.

Referring next to FIG. 21, a simplified diagram of an embodiment of a camera unit 108 is shown. The camera unit 108 comprises a housing 2102, one or more imaging devices 112, a processor unit 2104, and a communication device 2108. In some embodiments, the camera unit 108 lacks a user input and/or a display screen. The processor unit 2104 is a specialized processing unit and not a general-purpose computer. In some embodiments, the camera unit 108 comprises one or more input/output (I/O) ports 2112. In some embodiments, the I/O ports 2112 are arranged to connect (e.g., a direct connection) to neighboring camera units 108. In some embodiments, the I/O port 2112 is configured for a wired connection (e.g., for connection to another camera unit 108, to a hub, and/or to a central processing computer). In some embodiments, the I/O ports 2112 are part of the communication device 2108.

The communication device 2108 transmits and/or receives data with another camera unit 108 and/or a central processing computer. In some embodiments, the communication device 2108 comprises an antenna for wireless communication.

In the embodiment shown, the camera unit 108 comprises three imaging devices 112 integrated in the housing 2102. A first imaging device 112-1, a second imaging device 112-2, and a third imaging device 112-3. Each imaging device comprises a lens 2116 and an image sensor 2120. The image sensor 2120 is separated from the lens 2116 by a distance equal to the focal length f of the lens 2116.

The first imaging device 112-1 has a first field of view 2124-1. The second imaging device 112-2 has a second field of view 2124-2. The third imaging device 112-3 has a third field of view 2124-3. The first field of view 2124-1 and the second field of view 2124-2 at least partially overlap, but not totally overlap, forming a fourth field of view 2124-4. The fourth field of view 2124-4 is greater than the first field of view 2124-1. The fourth field of view 2124-4 is greater than the second field of view 2124-2.

Each imaging device 2116 has an orientation defined by a vector normal to the lens 2116 (e.g., pointing "out," away from the image sensor 2120). The orientation of the first imaging device 112-1 is at −30 degrees from the orientation of the second imaging device 112-2. The orientation of the third imaging device 112-3 is at +30 degrees from the orientation of the second imaging device 112-2.

The camera unit 108 has a fifth field of view 2124-5. The fifth field of view 2124-4 is equal to a sum of the first field of view 2124-1, the second field of view 2124-2, and the third field of view 2124-3.

In some embodiments, the housing comprises two or more cameras. In some embodiments, the housing comprises a processor to process images from the two or more cameras locally. Thus data generated by processing the images, which is much smaller than image data, is transmitted from the camera unit to the main processing computer. In some embodiments, camera units 108 each comprise a chipset for time synchronization. Thus images from sensors 2120 of different camera units 108 can by synced, enabling the main processing computer to identify position and/or orientation of an object in three dimensions. In some embodiments, images are processed at 30 frames a second (e.g., +/−30, 20, 10, and/or 5%). In some embodiments, camera units are used to track the object (e.g., at less than 30, 20, 10, and/or 1 frame per second (e.g., to reduce computations). In some embodiments, the camera units 108 track the object in a first mode and then determine position of the object in a second mode.

In some embodiments, a camera unit 108 comprises a power source (e.g., a battery, a solar panel, or both a battery and a solar panel). In some embodiments, the camera unit 108 comprises a connector to a power source. For example, the camera unit 108 comprises a USB port to connect to a USB power source and/or to download and/or upload data; the camera unit could comprise a port to connect to an outlet (e.g., a wall outlet that uses 120 volt alternating current). In some embodiments, the camera unit 108 comprises both a battery and a port to connect to power. For example, a camera unit 108 could use a battery while a central power source is unavailable. In a further example, a camera unit 108 on a pillar that has an outlet could be plugged into the outlet and another camera unit In some embodiments, a camera unit 108 is considered a main unit and has a power source and/or a port to connect to power and/or a transmitter to transmit data; another camera unit 108 is considered an axially unit and lacks a power source, a port to connect to power, a processor, and/or a transmitter (e.g., to enable less costly manufacturing). An auxiliary unit could with a main unit during operation. For example, for a 360 degree field of view, four camera units 108, each with 90 degree field of views are coupled together; one of the four camera units 108 is a main unit and three of the four camera units 108 are auxiliary units. Other variations can be used, for example, each camera unit 108 comprises a battery, a USB port, and a port for external power, but when plugging in camera units 108, one camera unit 108, the main unit, is plugged into external power (e.g., a wall outlet) and other camera units 108 (auxiliary units) are powered by plugging into the main unit. In some embodiments, the auxiliary units transmit data (e.g., through a wired USB port and/or wirelessly such as through Bluetooth) to the main unit and the main unit transmits data to the main processing computer. Transmitting data wirelessly close takes less power than transmitting data farther from the transmission point. Thus the main unit could be plugged in and the auxiliary units using battery power and/or the main unit having a larger battery than the auxiliary units.

In some embodiments, the camera units 108 are configured to be mounted. In some embodiments, the camera unit 108 is removably attached during use. In some embodiments, the camera unit 108 comprises a magnet 2126 coupled with the housing. Thus the camera unit 108 could be placed on a piece of metal (e.g., a wall, a support beam, a stationary vehicle, a pole, a sign, a filing cabinet, a door, a tripod, etc.). In some embodiments, a magnet 2126 is used because a magnet on metal is easy to put up and less likely to rotate. In some embodiments, the camera unit 108 comprises a clamp (e.g., a claim is attached to the housing and is used to grip an I-beam). In some embodiments, the camera is hung (e.g., using a cord, rope, or fishing line). In some embodiments, fasteners (e.g., screws, nails, and/or bolts, are used). For example, the housing comprises eyelets. In some embodiments, the housing comprises threads (e.g., ¼×20 inch threads for mounting to a tripod bolt).

In some embodiments, camera units 108 are separated from each other by at least 10, 15, 20, and/or 30 feet and/or less than 500, 300, 200, 100, 50, and/or 30 feet. For example, camera units 108 are separated from each other by at least 10 feet and no more than 50 feet. In some embodiments, camera separation is limited because cameras separated by greater distance can help triangulate better but if distances become too large then objects on the image sensors can become too small, depending on a field of view of the imaging devices. Applicant has found that three imaging devices in one housing is a good balance between the field of view of each imaging device and application to indoor workspaces.

Figure 22:
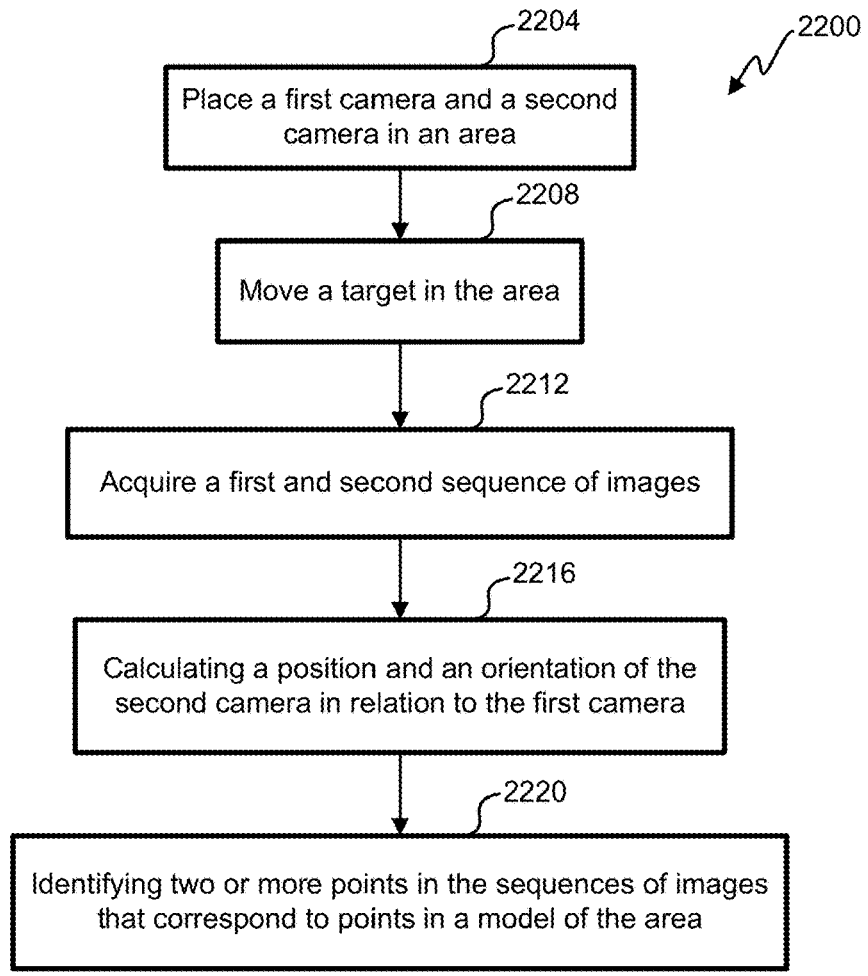
FIG. 22 illustrates a flowchart of an embodiment of a process for calculating positions and orientations of cameras without surveying.

FIG. 22 illustrates a flowchart of an embodiment of a process 2200 for calculating positions and orientations of cameras without surveying. The process 2200 begins in step 2204 by placing a first camera in an area (e.g., the working volume) and a second camera in the area. In some embodiments, the first camera is part of a first camera unit 108-1 and the second camera is part of a second camera unit 108-2. In some embodiments, the first camera and/or the second camera is an imaging device 112.

In step 2208, a target is moved through the area. In some embodiments, the target is the measurement stick 104. In some embodiments, the target is rotated and/or made to revolve about an axis as the target is moved through the area. The measurement stick 104 is defined by a length and a radius. In some embodiments, the axis is perpendicular to the length of the measurement stick 104. In some embodiments, the axis is at the middle of the length of the measurement stick 104.

In step 2212, a first sequence of images of the target is acquired using the first camera and a second sequence of images of the target is acquired using the second camera. In some embodiments, the first camera and the second camera are linked (e.g., wired and/or wireless; to acquire images concurrently).

In step 2216, positions and/or orientations of the first camera and/or the second camera are calculated. The calculations of the positions and/or orientations of the first camera and/or the second camera are based on the first sequence of images of the target, the second sequence of images of the target, and identification of the two or more points in the area in the first sequence of images and/or on the second sequence of images. In some embodiments, the calculations of the positions and/or orientations of the first camera and/or the second camera are based on the first sequence and the second sequence of images by using the collinearity equations and image acquisition of the measurement stick to determine relative positions and orientations of the first camera to the second camera (e.g., using techniques discussed above). The relative positions are determined in an arbitrary coordinate system. Using multiple images (e.g., at least 40 images) and multiple positions of the measurement stick reduces errors and enables more accurate determination of relative positions. In some embodiments 100, 200, 300, or more (and less than 500, 1000, and/or 10,000) positions of a target are used to get good relative position measurements. For example, 250, 300, 350, 400, or 500 positions of the target are used. In some embodiments, positions are redundant. For example, if the target is held stationary for a half second, and the camera speed is 30 frames per second, then there would be 15 images from each camera that could be redundant. In some embodiments, a user or a robot moves about the area twirling the measurement stick 104 so that the measurement stick 104 is in many different positions and orientations (e.g., to increase accuracy of determining relative positions of the first camera and the second camera).

In some embodiments, work can be performed in the arbitrary coordinate system (e.g., building a shed). In some embodiments, the positions and/or orientations of the first camera and/or the second camera are based on the identification of two or more points in the area by using the two or more points to calculate the position and/or orientation of the first camera and/or the second camera in relation to the area. For example, a user positions the measurement stick 104 at a point identified on the model of the area. In another example, the first camera uses the two or more points to determine the first camera's position and orientation in relation to the model of the area (sometimes referred to as the model coordinate system or world system). The arbitrary system is then mapped to the model coordinate system to that other cameras' positions and orientations can be calculated in the model coordinate system). In some embodiments, three, four, or more cameras are used and/or calibrated to each other. For example a third camera and/or a fourth camera are placed in the area and acquire a third sequence and/or a fourth sequence of images of the target. The target is identified by each camera at the same time. In some embodiments, to calculate each cameras' position and orientation more precisely, a number of identified targets is important; the more the better. In some embodiments, results for the second camera, the third camera, and so on are calculated with respect to the first camera. For example, the first camera has three-dimensional coordinates (e.g., Cartesian XYZ coordinates) and three angles (e.g., for orientation in three dimensions) are [0, 0, 0, 0, 0, 0]. In some embodiments, an axis (e.g., the X axis or Y axis) is defined by a line between the first camera and the second camera. Three angles and YZ (or XZ) are then calculated for the second camera. Angles and position coordinates (e.g., XYZ) are then calculated for additional cameras, if additional cameras are used. In some embodiments, two angles are used to define an orientation of a camera.

In step 2220, two or more points are identified in the area on one or more images of the first sequence of images and/or on one or more images of the second sequence of images. The two or more points correspond to points in a model of the area (e.g., a CAD model). The two or more points are used to calculate a position and/or orientation of the first camera and/or the second camera to the model. In some embodiments, the measurement stick is placed at the two or more points to identify the two or more points to the camera units. In some embodiments, step 2220 is skipped and camera positions and orientations are calculated relative to each other and not to a model.

Figure 23:
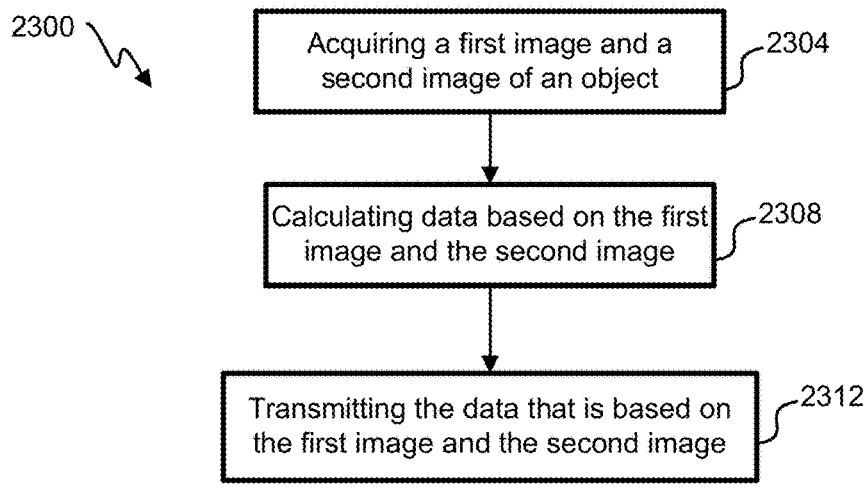
FIG. 23 illustrates a flowchart of an embodiment of a process for using a camera system.

FIG. 23 illustrates a flowchart of an embodiment of a process 2300 for using a camera system. The process 2300 begins in step 2304 with acquiring a first image and a second image of an object. The first image is acquired using a first image sensor (e.g., using the image sensor 2120 of the first imaging device 112-1). The first image is defined by first data. The second image is acquired using a second image sensor (e.g., using the image sensor 2120 of the second imaging device 112-2). The second image is defined by second data. The first image sensor and the second image sensor are both within a housing of a camera unit 108 (e.g., both within the housing 2102).

In step 2308, third data is calculated based on the first image and the second image. The processor unit 2104 processes the first data and the second data to calculate the third data. The third data corresponds to position information of the object in relation to the first image sensor and to position information of the object in relation to the second image sensor. In some embodiments, the position information includes a photo coordinate a of the object on the first image sensor and/or a photo coordinate a of the object on the second image sensor.

In step 2312, the third data, which is based on the first data and the second data, is transmitted. The third data is transmitted (e.g., using communication device 2108) from the processor unit 2104, which is in the housing 2102, to a main processing computer. The main processing computer is outside the housing 2102 of the camera unit 108. By processing information at the processor unit 2104 (e.g., locally) less data is transmitted on a network, saving bandwidth on the network.

In some embodiments a first camera unit 108-1 is placed at a first location and a second camera unit 108-2 is placed at a second location. In some embodiments, the first location is separated from the second location by at least 10 feet and less than 200 feet.

Figure 24:
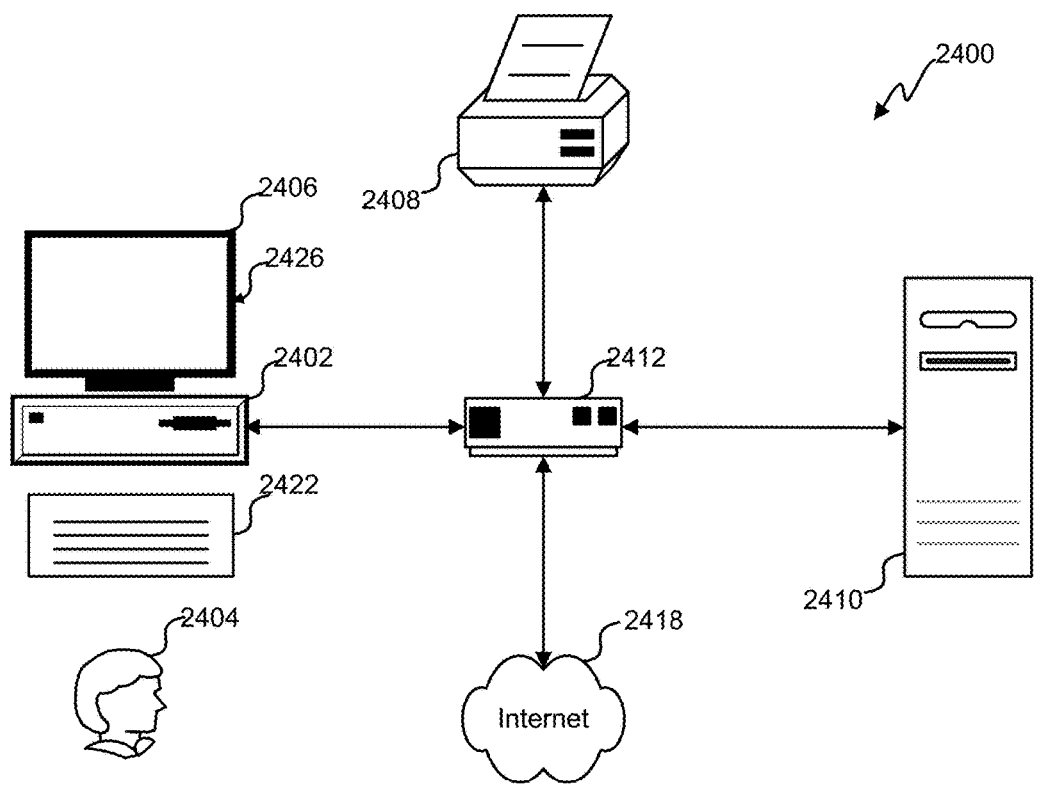
FIG. 24 depicts a block diagram of an embodiment of a computer system.

Referring next to FIG. 24, an exemplary environment with which embodiments may be implemented is shown with a computer system 2400 that can be used by a designer 2404 to design, for example, electronic designs. The computer system 2400 can include a computer 2402, keyboard 2422, a network router 2412, a printer 2408, and a monitor 2406. The monitor 2406, processor 2402 and keyboard 2422 are part of a computer system, which can be a laptop computer, desktop computer, handheld computer, mainframe computer, etc. The monitor 2406 can be a CRT, flat screen, etc.

A designer 2404 can input commands into the computer 2402 using various input devices, such as a mouse, keyboard 2422, track ball, touch screen, etc. If the computer system 2400 comprises a mainframe, a designer 2404 can access the computer 2402 using, for example, a terminal or terminal interface. Additionally, the computer 2402 may be connected to a printer 2408 and a server 2410 using a network router 2412, which may connect to the Internet 2418 or a WAN.

The server 2410 may, for example, be used to store additional software programs and data. In one embodiment, software implementing the systems and methods described herein can be stored on a storage medium in the server 2410. Thus, the software can be run from the storage medium in the server 2410. In another embodiment, software implementing the systems and methods described herein can be stored on a storage medium in the computer 2402. Thus, the software can be run from the storage medium in the computer 2402. Therefore, in this embodiment, the software can be used whether or not computer 2402 is connected to network router 2412. Printer 2408 may be connected directly to computer 2402, in which case, the computer system 2400 can print whether or not it is connected to network router 2412.

Figure 25:
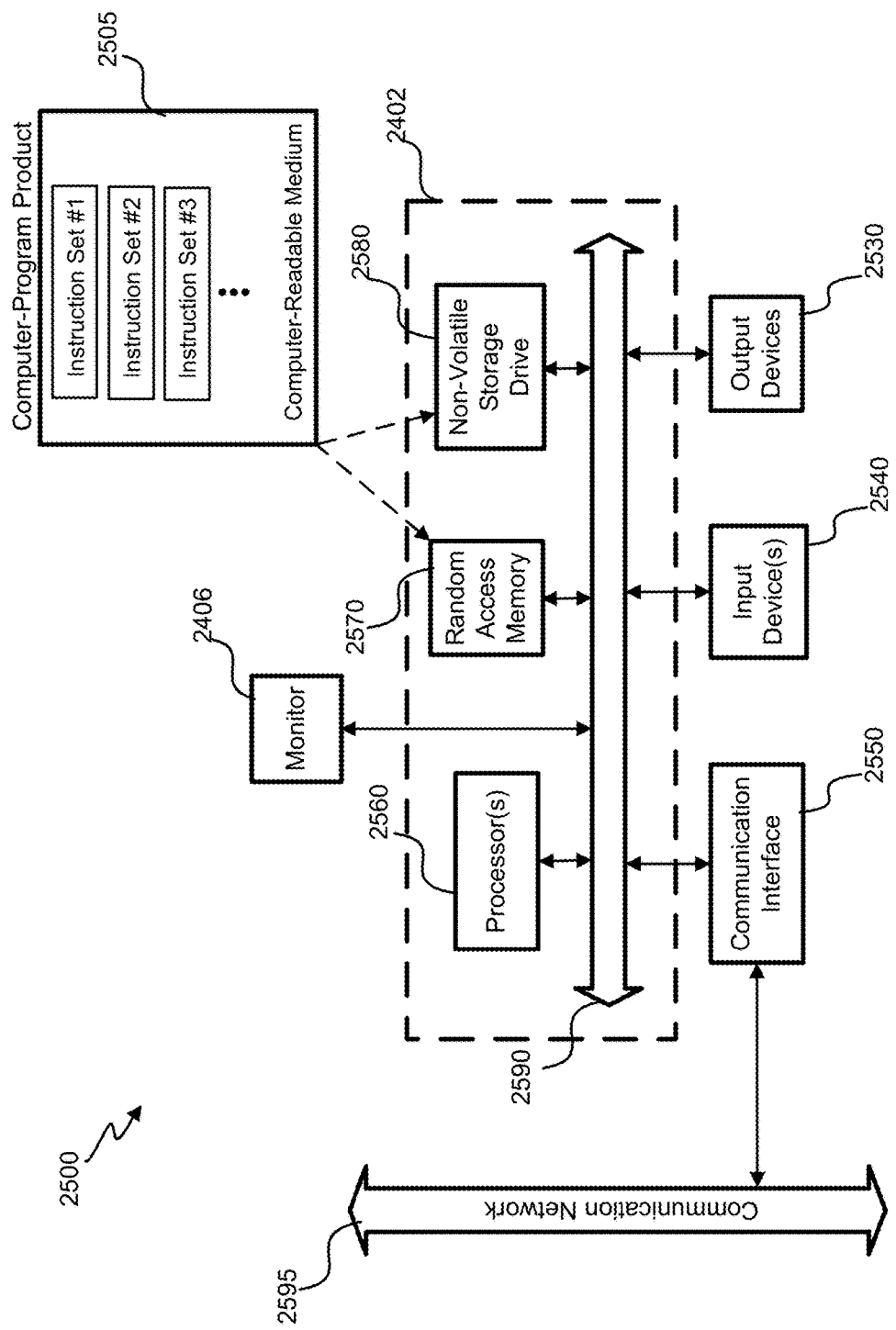
FIG. 25 depicts a block diagram of an embodiment of a special-purpose computer system.

With reference to FIG. 25, an embodiment of a special-purpose computer system 2500 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system, it is transformed into the special-purpose computer system 2500.

Special-purpose computer system 2500 comprises a computer 2402, a monitor 2406 coupled to computer 2402, one or more additional user output devices 2530 (optional) coupled to computer 2402, one or more user input devices 2540 (e.g., keyboard, mouse, track ball, touch screen) coupled to computer 2402, an optional communications interface 2550 coupled to computer 2402, a computer-program product 2505 stored in a tangible computer-readable memory in computer 2402. Computer-program product 2505 directs system 2500 to perform the above-described methods. Computer 2402 may include one or more processors 2560 that communicate with a number of peripheral devices via a bus subsystem 2590. These peripheral devices may include user output device(s) 2530, user input device(s) 2540, communications interface 2550, and a storage subsystem, such as random access memory (RAM) 2570 and non-volatile storage drive 2580 (e.g., disk drive, optical drive, solid state drive), which are forms of tangible computer-readable memory.

Computer-program product 2505 may be stored in non-volatile storage drive 2580 or another computer-readable medium accessible to computer 2402 and loaded into memory 2570. Each processor 2560 may comprise a microprocessor, such as a microprocessor from Intel® or Advanced Micro Devices, Inc.®, or the like. To support computer-program product 2505, the computer 2402 runs an operating system that handles the communications of product 2505 with the above-noted components, as well as the communications between the above-noted components in support of the computer-program product 2505. Exemplary operating systems include Windows® or the like from Microsoft Corporation, Solaris® from Sun Microsystems, LINUX, UNIX, and the like.

User input devices 2540 include all possible types of devices and mechanisms to input information to computer 2402. These may include a keyboard, a keypad, a mouse, a scanner, a digital drawing pad, a touch screen incorporated into the display, audio input devices such as voice recognition systems, microphones, and other types of input devices. In various embodiments, user input devices 2540 are typically embodied as a computer mouse, a trackball, a track pad, a joystick, wireless remote, a drawing tablet, a voice command system. User input devices 2540 typically allow a user to select objects, icons, text and the like that appear on the monitor 2406 via a command such as a click of a button or the like. User output devices 2530 include all possible types of devices and mechanisms to output information from computer 2402. These may include a display (e.g., monitor 2406), printers, non-visual displays such as audio output devices, etc.

Communications interface 2550 provides an interface to other communication networks and devices and may serve as an interface to receive data from and transmit data to other systems, WANs and/or the Internet 2418. Embodiments of communications interface 2550 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 2550 may be coupled to a computer network, to a FireWire® bus, or the like. In other embodiments, communications interface 2550 may be physically integrated on the motherboard of computer 2402, and/or may be a software program, or the like.

RAM 2570 and non-volatile storage drive 2580 are examples of tangible computer-readable media configured to store data such as computer-program product embodiments, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 2570 and non-volatile storage drive 2580 may be configured to store the basic programming and data constructs that provide the functionality of various embodiments.

Software instruction sets that provide functionality may be stored in RAM 2570 and non-volatile storage drive 2580. These instruction sets or code may be executed by the processor(s) 2560. RAM 2570 and non-volatile storage drive 2580 may also provide a repository to store data and data structures. RAM 2570 and non-volatile storage drive 2580 may include a number of memories including a main random access memory (RAM) to store of instructions and data during program execution and a read-only memory (ROM) in which fixed instructions are stored. RAM 2570 and non-volatile storage drive 2580 may include a file storage subsystem providing persistent (non-volatile) storage of program and/or data files. RAM 2570 and non-volatile storage drive 2580 may also include removable storage systems, such as removable flash memory.

Bus subsystem 2590 provides a mechanism to allow the various components and subsystems of computer 2402 communicate with each other as intended. Although bus subsystem 2590 is shown schematically as a single bus, alternative embodiments of the bus subsystem 2590 may utilize multiple busses or communication paths within the computer 2402.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

While the principles of the disclosure have been described above in connection with specific apparatuses and methods, it is to be clearly understood that this description is made only by way of example and not as limitation on the scope of the disclosure.

The specific details of particular embodiments may be combined in any suitable manner without departing from the spirit and scope of embodiments. However, other embodiments may be directed to specific embodiments relating to each individual aspect, or specific combinations of these individual aspects.

The above description of exemplary embodiments has been presented for the purposes of illustration and description. It is not intended to be exhaustive or to limit to the precise form described, and many modifications and variations are possible in light of the teaching above.

The embodiments were chosen and described in order to explain the principles of the invention and practical applications to thereby enable others skilled in the art to best utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A system for providing position and orientation of an object at a worksite, the system comprising:
    a first camera unit;
    a second camera unit;
    a third camera unit;
    a stick, wherein the stick comprises:
        central markings of known dimensions;
        an end marking of known dimensions;
        the end marking has different dimensions than the central markings; and
        the central markings have a repeating pattern; and
    one or more processors configured to track a position and an orientation of the stick in three dimensions based on known dimensions of the end marking, the repeating pattern of the central markings, and known positions of the first camera unit, the second camera unit, and the third camera unit.

2. The system of claim 1, further comprising a fourth camera unit.

3. The system of claim 1, further comprising a chip set for coordinating timing of the first camera unit, the second camera unit, and the third camera unit in acquiring images.

4. The system of claim 1, wherein
    the one or more processors are configured to use the repeating pattern of the central markings to determine a scale of the stick in images to determine a dimension of the end marking in images.

5. The system of claim 1, wherein the one or more processors are configured to track the position and the orientation of the stick in three dimensions based on the known dimensions of the central markings, known dimensions of the end marking, and known positions of the first camera unit, the second camera unit, and the third camera unit by:
    acquiring a plurality of images of the object using the first camera unit, the second camera unit, and the third camera unit, wherein the object has a first end and a second end;
    calculating a plurality of two-dimensional line equations based on the plurality of images;

calculating a three-dimensional line equation based on the plurality of two-dimensional line equations;

determining the first end and/or the second end of the object in each of the plurality of images; and determining coordinates of the object in three dimensions based on determining the first end and/or the second end of the object in the plurality of images.

6. The system of claim 5, wherein the one or more processors are configured to calculate the plurality of two-dimensional line equations by:

converting color images to gray tone, applying a derivative filter to gray-tone images, subtracting background in images, detecting key points to identify the object in images, and refining an initial line equation based on detecting the key points.

7. The system of claim 1, wherein the stick comprises:

a first end, a second end opposite the first end, a first marking nearer the first end than the second end for imaging by the first camera unit and the second camera unit, and a second marking between the first marking and the second end for imaging by the first camera unit and the second camera unit.

8. The system of claim 7, wherein the stick has a length equal to or greater than 0.5 meters and equal to or less than 1.5 meters.

9. The system of claim 1, further comprising:

a first set of templates for determining a scale of the repeating pattern and to use for selecting a template of a second set of templates, and the second set of templates for identifying an end of the stick.

10. The system of claim 9, wherein each template of the first set of templates has a width, and the width is equal to or greater than one pixel and equal to or less than 20 pixels.

* * * * *